US012197856B2

(12) United States Patent
Lord et al.

(10) Patent No.: US 12,197,856 B2
(45) Date of Patent: Jan. 14, 2025

(54) SYSTEM AND METHOD FOR INCREASING EFFECTIVE COMMUNICATION THROUGH EVALUATION OF MULTIMODAL DATA, AUTO-CORRECTION AND BEHAVIORAL SUGGESTIONS BASED ON MODELS FROM EVIDENCE-BASED COUNSELING, MOTIVATIONAL INTERVIEWING, AND EMPATHY

(71) Applicant: EMPATHY ROCKS, INC., Bellevue, WA (US)

(72) Inventors: Sarah Peregrine Lord, Yarrow Point, WA (US); Nicolas Bertagnolli, Salt Lake City, UT (US)

(73) Assignee: Empathy Rocks, Inc., Bellevue, WA (US)

( * ) Notice: Subject to any disclaimer, the term of this patent is extended or adjusted under 35 U.S.C. 154(b) by 0 days.

(21) Appl. No.: 17/731,230

(22) Filed: Apr. 27, 2022

(65) Prior Publication Data

US 2022/0343065 A1    Oct. 27, 2022

Related U.S. Application Data

(60) Provisional application No. 63/180,325, filed on Apr. 27, 2021.

(51) Int. Cl.
*G06F 40/20* (2020.01)
*G06F 40/166* (2020.01)
*G09B 19/00* (2006.01)

(52) U.S. Cl.
CPC ............ *G06F 40/20* (2020.01); *G06F 40/166* (2020.01); *G09B 19/00* (2013.01)

(58) Field of Classification Search
None
See application file for complete search history.

(56) References Cited

U.S. PATENT DOCUMENTS 10,015,316 B1    7/2018  Horne et al.
10,448,887 B2 *  10/2019 Danson ................. G16H 20/70
(Continued)

FOREIGN PATENT DOCUMENTS

JP    2018510414 A    4/2018

OTHER PUBLICATIONS

Coan et al., "The Specific Affect Coding System (SPAFF)," In: Handbook of Emotion Elicitation and Assessment, Ch. 16, Retrieved Jan. 3, 2023 from https://www.researchgate.net/publication/230676408_The_Specific_Affect_Coding_System_SPAFF, Apr. 2007, 19 pages.

(Continued)

*Primary Examiner* — Ariel Mercado-Vargas
(74) *Attorney, Agent, or Firm* — Koren Anderson

(57) ABSTRACT

Systems and methods are described for providing empathy corrections and predictions to various communications. In some aspects, a method may include obtaining training data to train a plurality of empathy correction models, where the training data is obtained through empathy games that elicit labels indicating an empathy score for individual statements and indicating at least one empathy characteristic upon which the empathy score is based. At least one statement from a communication platform may be obtained and an empathy score may be determined for statement using the empathy corrections models. The empathy score may be compared to an empathy threshold, and if the empathy score is below the empathy threshold, at least one correction to the statement may be determined to improve empathy of the first empathy characteristic, using the plurality of empathy correction models. The correction may then be provided to the communication platform.

16 Claims, 20 Drawing Sheets

(56) References Cited

U.S. PATENT DOCUMENTS

| | | | |
|---|---|---|---|
| 10,558,740 B1* | 2/2020 | O'Malley | G06F 40/197 |
| 10,592,503 B2* | 3/2020 | Kozloski | G06F 16/24578 |
| 2011/0213211 A1* | 9/2011 | Stevens | G06Q 10/00 |
| | | | 600/300 |
| 2016/0357744 A1 | 12/2016 | Kozloski et al. | |
| 2017/0213190 A1* | 7/2017 | Hazan | G06F 16/951 |
| 2018/0110460 A1* | 4/2018 | Danson | A61B 5/14542 |
| 2018/0317840 A1* | 11/2018 | Ben-Kiki | A61B 5/4833 |
| 2020/0126545 A1 | 4/2020 | Kakkar et al. | |
| 2021/0065091 A1* | 3/2021 | Bhattacharyya | G06F 40/30 |
| 2021/0097240 A1* | 4/2021 | Singh | G06F 40/253 |
| 2021/0133509 A1* | 5/2021 | Wall | G06N 20/00 |
| 2022/0129621 A1* | 4/2022 | Guda | G06F 40/166 |

OTHER PUBLICATIONS

International Search Report and Written Opinion mailed Aug. 12, 2022, Patent Application No. PCT/US2022/026604, 13 pages.

\* cited by examiner

FIG. 5

Our games will train you in basic listening and empathy skills. You can play for free! Start at the top to begin your journey as a genuine empathic master. If you are a licensed counselor and would like continuing education for your game play just hit "Cash out" when you've completed all levels. Learn more.

LISTEN WITH EMPATHY

| | |
|---|---|
| Rate Reflections | ✓ |
| Rate Questions | ✓ |
| Rate Affirmations | ⊖ |
| Learn Reflections | ⊖ |
| Learn Questions | ⊖ |
| Advanced Reflections | ⊖ |
| Advanced Questions | ⊖ |
| Learn Affirmations | ⊖ |

FIG. 8

Empathy Inspection Instructions

Your fellow empathy rockstars have been busy responding to folks in need of support. Its your turn to rate their responses and learn more about effective listening skills.

Vote with a 🙂 if you think the response is fairly empathic

Vote with a 😐 if you aren't sure

Vote with a 🙁 if you think the response is not empathic

Vote with a 😄 if you think the response is funny speed_reflect

What makes a good reflection you might ask?

Good reflections demonstrate accurate understanding, not just warmth or sympathy.

For example:

You have been making time to really improve yourself.   ♦

This has been tough for you.   ♦

If you still want more examples read the directions on reflections, affirmations, and open questions here.

Time to inspect the GEMS!

Inspect: Reflections

◆ ◆ ◆ ◆ ◆ ◆ ◆ ◆ ◆ ◆

Hello, since the time I was around 13 I was always fascinated with drugs. I started using around 14 which started with nicotine. Eventually I moved on to things such as beer and weed. I smoked weed daily and still continue to use it daily for medical reasons.

Empathic Response

It has been a big part of your life.

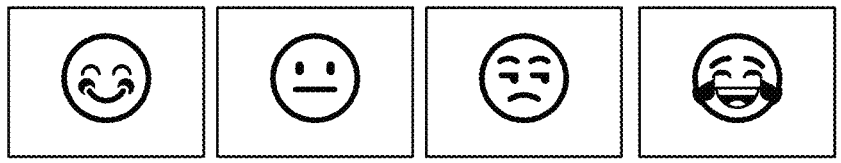

I have an even better response:

[                                    ]

[ Submit Correction ]

FIG. 10

How to Play

You sound like you could be a genuine empathic master in the empathy rocks reflection game. We've found statement from real people that need support for you to practice the most important listening skill: reflections.

What is a reflection?

It's a paraphrase or repetition of what you heard to demonstrate understanding. To reflect, all you have to do is repeat back what you think a person is saying. Here's an example. When someone says:

> I'm really worried about my test next week

| | | |
|---|---|---|
| You say: | Sounds like you are very worried about your test next week |  |
| Or: | Seems like you're spinning out right now |  |
| Or: | You are really worried about your test |  |
| Not: | Is the test going to be hard? |  |
| Not: | I'm so sorry!! |  |
| Not: | Well you should probably start by studying |  |

In real-life listening, you will learn to combine every skill you've learned from our empathy rocks games. This is why they are designed for you to practice one skill at a time. For this game, keep it simple, it's not the time to ask questions, express sympathy, or give advice, just repeat what you hear. Surprisingly simple.

FIG. 11

Reflect like a gem

I am a 23 year old female and I feel like my mental health has really been struggling and I am not sure if it is because of COVID or because I am developing bipolar disorder.

You say:

[ Reflect ]  [ Skip ]

I need a hint

You might feel tempted here to say, "Wow. I'm sorry." or "That sucks." But the point of reflections is to express that you heard and understand what they are saying, not just sympathize.

Reflections can feel like hypotheses or closed questions, like "So you're really working hard on yourself" or "It feels important to you to be independent." You don't know if this is the case but you are testing your understanding. If you get really stuck just paraphrase or repeat back one sentence of what you heard.

FIG. 12

Dig in with open questions

I know I'm not the only one byt COVID is giving me so much anxiety lately

You say:

| How could| |

| Question | Skip |

I need a hint

Reflect like a gem

I'm (25m) an alcoholic. I've struggled with alcohol for the past 4-5 years with it really ramping up the past 3 years. I'm able to go long periods of time without drinking but I always eventually drink again. Whenever I drink, I binge, blackout, and lose all control.

You Said:

If I have it right, you aren't sure you want to lose control.

Therapists Say:

You showed that you were listening by starting your reflection with "if I have it right"

◈ Got it ◈

FIG. 14

Reflect like a gem

My fiancé and I have almost the best relationship every girl wants, but lately it's changed. I get less attention and little to no intercourse. He works a lot and goes to the gym a lot (he's a football player for an indoor league), but he has no time for me. We live two hours from family, and when I leave home to see family, he'll text me saying "whatever" and "leave me alone."

You say:

| whatever  |

Try a different response that shows you understand by repeating what you heard

| Reflect | Skip |

I need a hint

FIG. 16

SYSTEM AND METHOD FOR INCREASING EFFECTIVE COMMUNICATION THROUGH EVALUATION OF MULTIMODAL DATA, AUTO-CORRECTION AND BEHAVIORAL SUGGESTIONS BASED ON MODELS FROM EVIDENCE-BASED COUNSELING, MOTIVATIONAL INTERVIEWING, AND EMPATHY

CROSS-REFERENCE TO RELATED APPLICATIONS

This application claims the benefit of U.S. Provisional Patent Application No. 63/180,325, filed Apr. 27, 2021, titled "SYSTEM AND METHOD FOR INCREASING EFFECTIVE COMMUNICATION THROUGH EVALUATION OF MULTIMODAL DATA, AUTO-CORRECTION AND BEHAVIORAL SUGGESTIONS BASED ON MODELS FROM EVIDENCE-BASED COUNSELING, MOTIVATIONAL INTERVIEWING, AND EMPATHY," the disclosure of which is incorporated herein by reference in its entirety.

BACKGROUND

In prior research has established that problems and issues relating to communication result in various costs, including productivity loss, churn, and legal fees related to communication problems. This problem has been made worse with text-based communication and other technologies for online work collaboration, particularly in the remote work setting. Prior research has also established that talking to others following rules of motivational interviewing is associated with increased empathy and behavior change. Prior research has also established that talking to others following rules of motivational interviewing is associated with cost-savings at scale to businesses. The current state of the art includes online courses or daily workshops to train individuals in motivational interviewing. However, studies on the training of others in motivational interviewing have found that workshops do not lead to skill acquisition or retention. In fact, deliberate practice with in-the-moment coaching or instant feedback is one of the only effective and proven ways to shape and train counseling and communication behaviors.

In view of the foregoing, a need exists for an improved system and method for scaling the training of empathy and effective communication following guidelines of evidence-based counseling to overcome the aforementioned obstacles and deficiencies of conventional training and behavior correction systems.

BRIEF DESCRIPTION OF THE DRAWINGS

Various techniques will be described with reference to the drawings, in which:

FIG. 5 illustrates an example of a front-end system including an API back-end with different levels for each metric and corrections for sentences, which may utilized in the systems of FIGS. 1 and 2, according to at least one embodiment;

FIGS. 7A-7D and 8-16 illustrate different example views of empathy games, as may be utilized by systems of FIGS. 1 and 2, according to at least one embodiment.

DETAILED DESCRIPTION

Figure 1:
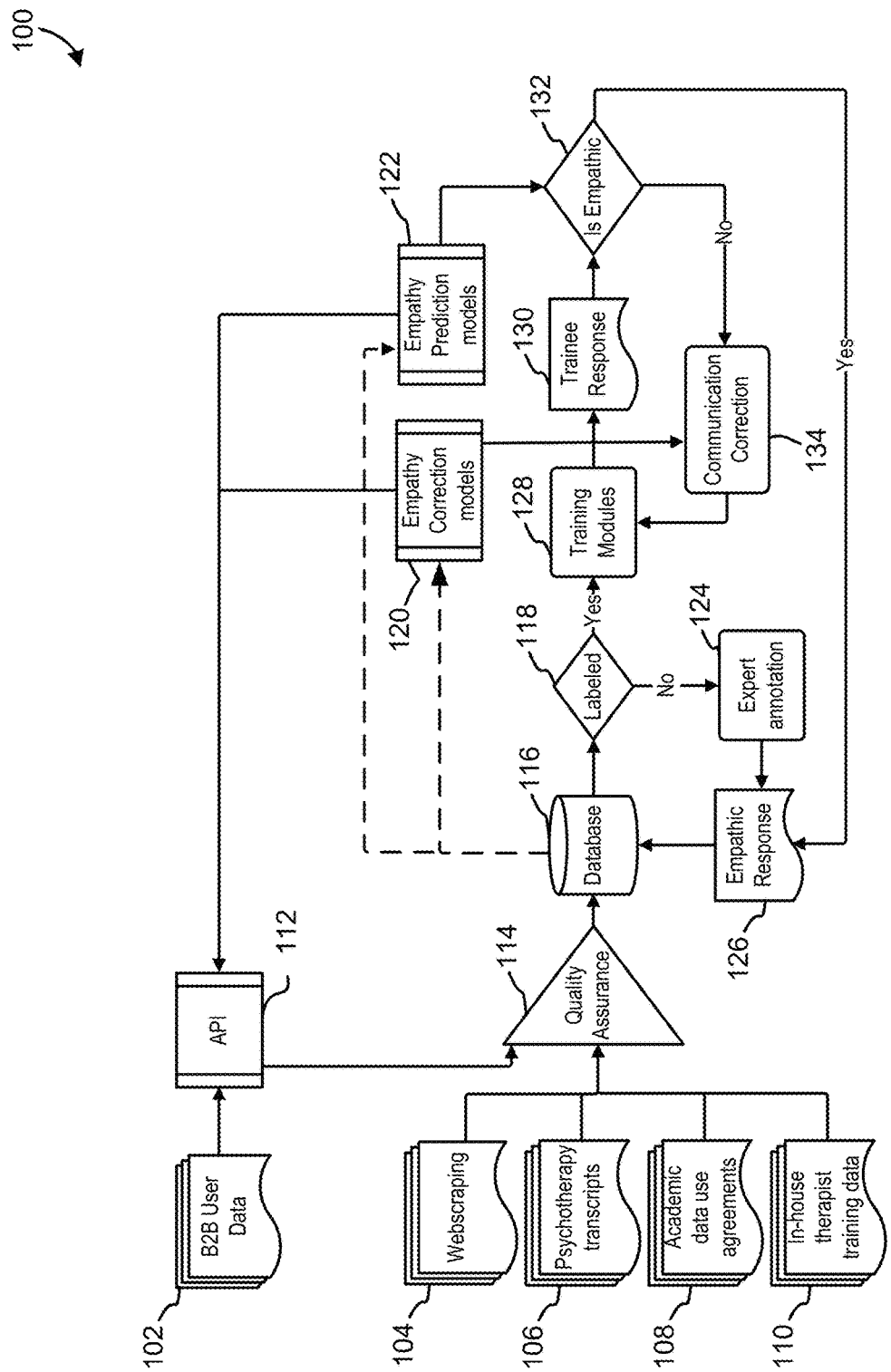
FIG. 1 illustrates an example a system of data capture and modeling for evaluation, annotation, and correction of different communication modes, according to at least one embodiment.

The described systems and methods auto-correct, and make suggestions or annotations to, multi-modal data sources to improve effective communication and human empathy. The described systems and methods capture data from one or more various multi-modal sources (e.g., voice, text, video, images), analyze these sources, and compare them against one or more of the following: a) models based on evidence-based counseling including motivational interviewing, general counseling/common factors, client-centered therapy, humanistic therapy, cognitive behavioral therapy, and other evidence-based counseling skills that promote effective communication and empathy; b) models designed to reduce biased, confrontational, hateful, and gendered language; and c) other models related to specific methods of effective speech (e.g., customer discovery or negotiation).

In some aspects, the described system produces a correction or change to the data (e.g., some form of communication) in up to three different forms: 1) behavioral corrections and prompts (e.g., suggest a meeting), 2) speech corrections (e.g., replacing closed questions with open questions), and 3) auto-complete (e.g., introductions or conclusions to communications are templated). In some aspects, the described system creates a summary report of statistics or visual dashboard to view the corrections and improvements, such as may be tracked and compiled over time. As described herein, a primary goal of correction is behavioral change (e.g., changing voice, speech, text communication, or actions) to ultimately improved real-time, near-real time, and other forms of communication.

The described system, which may be referred to as mpathic.ai (Trademarked), is designed to improve human empathy and shape behavior, by offering suggestions to help humans talk to other humans using artificial intelligence and/or machine learning techniques. The described system and techniques may improve human communication to become more effective, empathic, and understanding. In some aspects, the described system and techniques may take the form of an empathy engine or application programming interface (API) that can be plugged into any of various communication systems, such as Slack or other chat messaging platform, email, text messaging, Alexa, chatbots, and so on, to improve communication.

In some aspects, the described system can be applied to take the rules and guidance of any evidence-based counseling system or any other communication system to correct and/or annotate communication. For example, the system can improve empathy following motivational interviewing or it can also provide corrections to be conversely more directive, authoritative, and less collaborative. The system can be configured to a persona or output (e.g., professional, empathic, directive), or users can upload training data or sample text that they would like to emulate (e.g., I would like to talk like my dad, here is all my text communications with him or I would like to talk like x famous author, here are books that this person has written).

In some aspects, the described system to correct empathy and improve effective communication is based on or utilizes machine learning models of human empathy from a multitude of data sources including one or more of proprietary empathy games, psychotherapy transcripts, web scraping publicly available data (like reddit), business customer or partner data sharing, open-source data, expert generated data, synthetic data. More detailed examples of these sources will be described in greater detail below.

The empathy games data source may include a freely available empathy skills training game, such as a game called Empathy Rocks (Trademarked) (www.empathy-.rocks) that specifically elicits statements from clinicians, counselors, peer supports and/or therapists and asks them to label text. Various interactions with an example empathy game are provided and described in greater detail below, including views of different forms of annotation by expert data labelers. The game responses make up a data flywheel and a data source to improve empathy. In some cases, therapists may become expert labelers and data annotators to improve one or more models that may be used as inputs to the described system. In particular, the games may train in motivational interviewing evidence-based counseling skills which are associated objectively with improved empathy, collaboration, understanding among other qualities. Content from any multimodal data source may be placed into the game for evaluation and training the models that may be output or derived from the games. For example, one application is correcting the text in emails or work collaboration tools (Slack), by placing statements from these sources into the games for evaluation and response from this network of expert labelers.

In some examples, the prompts for the game are sourced from webscraping and then curated or filtered and altered to elicit the particular empathic and effective responses that can improve the one or more models. The data may be curated or modified to reduce bias, such as by tracking and sourcing this data from different demographics to balance race, gender, ethnicity, nationality, and other identities, when possible. Data may be scraped using publicly available APIs and also custom crawlers, such as written in Python and deployed in the cloud. The data scraped may contain human questions, statements, or descriptions of problems or experiences, and responses from the community.

The data sources for the described system may include one or more of various data sources, such as one or more of the following. One source for the described system may include publicly available psychotherapy transcripts, and private transcripts as well (e.g., modified to provide anonymity to the communicators). Another data source for the described system may include webscraping from reddit forums (mental health, depression, addiction, posttraumatic stress disorder (PTSD), PTSD combat, suicide, relationships, covid, etc.), metafilter, Youtube, counselchat, and other open source data. Yet another data source for the described system may include business customer data: In some aspects, the empathy games may be white labeled by business partners for data sharing where data is obtained from the games and other multimodal input (e.g., voice from an audio recording empathic response or video from a Zoom video call) in addition to responses in the games themselves. Another data source for the described system may include open-source data. The open-source data may be used and integrated into the models to improve communication to make the models less gendered and bias.

The described techniques can be applied to any evidence-based counseling skill to improve important constructs related to effective communication such as support of autonomy, curiosity, collaboration and partnership, alliance, advice-giving with permission, and many other skills. This may be accomplished by labeling the input data as containing one or more desirable or non-desirable traits or attributes, and then using these labels to train one or more machine learning models to provide suggestions to user communications.

The described system may also use one or more algorithms developed by domain expert clinical psychologists. The one or more algorithms may be rules-based, based on integrations from rules and machine learning on labeled data using the codes described in more detail below, or a combination thereof. The algorithms may be based on evidence-based counseling skills for what leads to increased objective perceptions of empathy and effective communication. In some aspects, the rules take examples of un-empathic behaviors and suggest conversation to an empathic behavior.

Some examples of un-empathetic behaviors may include: 1) Providing advice without asking permission or emphasizing control or summarizing, would result in the system producing a prompt to first ask permission, emphasize control, or summarize and reflect what was previously heard. 2) Sending a series of close-ended questions result in the system producing a prompt to replace the close-ended question or questions with open-ended questions. 3) Using any bias, confrontational or negative speech pattern would be flagged as such and given a specific prompt to replace the text or request an in-person meeting (e.g., do not document or send content). 4) Affirmations may be suggested at the start of communication (e.g., a "shit sandwich") along with positive bids for continued contact at the end of the communication. 5) Reflections may also be prompted after the receiver gets a lot of information, prior to the sender giving information. Note the words reflections, giving information, affirmations, confrontation and other terms here may be specifically defined behaviorally and in speech, as described in more detail below.

The described system takes in or ingests text or reduces data to a textual form through Automatic Speech Recognition either using Kaldi, transformers, Amazon ASR, or a similar service. Once the data is in the form of text, various machine learning models may be applied to the data to determine if a correction is warranted and what corrections should be made if any. To determine if a correction is warranted, a number of machine learning models may be utilized. Many of these models may be simple statistical models such as logistic regression, random forests, extreme gradient boosted trees, simple rule-based regexes to look for gendered or biased language, neural networks, transformers, etc. These models may be trained to look for a variety of factors relating to poor communication, sensitive situations, etc. They may be trained to predict if communication is in need of empathic corrections and also identify if the language used could benefit from an evidence-based psychological technique like motivational interviewing. An example would be recognizing that someone has asked a closed-ended question. Another example would be identifying charged and potentially offensive language. A number of possible examples of empathic and non-empathic communication patterns and speech behaviors are described in greater detail below.

Once these models are run on the data, if any of them return a value of true (indicating a correction is needed or recommended), the system proceeds to make a correction in one of the three forms: a speech correction/replacement, an additional phrase suggestion like auto-complete, or a behavioral prompt or action. In the case of confrontational, aggressive language the system may provide a recommendation that the user doesn't send the message and suggest a behavioral prompt like "request a meeting". If the system detects any minor non-empathetic or ineffective language such as gendered language, closed instead of open questions, advice instead of reflections, a separate model may be used using the above-mentioned statistical technologies to determine the type of suggestion to provide. These suggestions are then returned through the API.

The described models are trained in a variety of ways. One is by the hand-tuning of expert rules. Psychologists may tailor linguistic rules to identify certain types of empathetic and unempathetic language. The other is by using data collected from webscraping, transcripts, and empathy games. This data is formatted where the model will see a person's problem statement and the empathetic response associated with the statement. The system may then predict how empathetic the response is, and what kind of response it was.

FIG. 1 Illustrates an example empathy system 100 of data capture and ML modeling for evaluation and correction of empathy. As illustrated, the system 100 may include a number of different data sources, such as business to business (B2) user data 102, data pulled from webscraping 104, psychotherapy transcripts 106, academic data subject to use agreements 108, and in-house therapist training data 110. The data obtained from one or more of data sources 102-110 may take the form of communications or conversations had between different entities, such as human interactions, and may be broadly organized into statements, sentences, paragraphs, complete thoughts, or various other logical constructs. In some examples, the data may take the form of conversations, where speakers of each statement are somehow labeled or identified in the data itself, such as described in greater detail below.

In some examples, as illustrated, the B2B user data 102 may be automatically pulled or obtained using one or more APIs 112. Data from one or more of the data sources, 102, 104, 106, 108, 110 may be passed through a filter or quality assurance process 114, which may ensure that the data obtain can be used by the system 100. In some aspects, the quality assurance process 114 may ensure that the data sources include example communications, notes, topics, etc., that can be used by the system 100 and/or in a format usable by the system (complete statements, sentences, paragraphs, etc., conversations that link speakers to different statements, etc.) to train one or more models to be used to correction communications based on a number of different factors or characteristics, as will be described in greater detail below.

Once the data sources have pass through or been accepted as useful for system 100 by the quality assurance process 114, the data may be stored in one or more databases or data stores 116. The database(s) 116 may include any known type of physical or hardware storage device, virtual or cloud data storage resources, and/or software to organize, manage, and facilitate access to the various data that is ingested by system 100. In some cases, a separate database or partition within a database or datastore 116 may be utilized for each of a number of different characteristics or attributed of communication that can be identified and/or corrected. In some cases, the data obtained from one or more of data sources 102-110 may already include labels or annotations of characteristics that are labels or annotations of empathy characteristics.

The various data that is obtained from the different data sources 102-110, filtered, and stored in database 116 may then be processed, at operation 118 to determine if it contains or annotations or labels that can be used by the system 100 to build and/or refine (e.g., train) one or more empathy correction models 120 or one or more empathy prediction models 122. If no labels are contained or associated with the data, at operation 118, expert annotation, such as by one or more trained professionals, therapists, etc., may be applied at operation 124. In some cases, the annotated data may be saved back into the database 116. In other cases, the data may be filtered such that data that indicates an empathic response, as determined at operation 126, may be saved into the database and labeled as such, and subsequently used to train one or more empathy correction models 120 or one or more empathy prediction models 122.

In some cases, the annotations or labels that are either associated with data or added to the data, at operation 124, may take the form of one or more characterizations of different portions of communication. In some aspects, different statements in the data may be labeled as being associated with high, neutral, or low empathy, whereby high empathy statements are encouraged, low empathy statements are discouraged or corrected, and neutral empathy statements may be determined to be associated with one of high or low empathy based on context of the statement.

In some cases, data that is already labeled, as determined at operation 118, may be sent to one or more training modules 128, which may be an example or of or include one or more empathy games, as described in greater detail below. A therapist or other qualified individual, or in some embodiments, an automated system, may characterize the statements in the data, and provide responses at operation 130. The trainee responses 130 may then be determined if they are empathic (e.g., exhibiting high or at least neutral empathy), at operation 132. If yes, then the statements or responses may be labeled as empathic at operation 126 and saved in the database 116. If the trainee responses 130 are deemed to indicate negative empathic responses, at operation 132, then some type of empathic or communication correction may be applied, at operation 134, and the statement (or other from such as a conversion, etc., that the data takes), may then be reprocessed through the training modules 128, to generate a response 130, and examined to determine if they are empathic, at operation 132. This process may continue until an empathic response is submitted. In some examples, trainee and expert annotation 130, 124 may represent the therapist that is playing the empathy games or training modules 128 and correcting and annotating data while they play the games.

As illustrated in system 100, in some cases, one or more feedback loops may be provided to train one or more of the empathy corrections models 120 or one or more empathy prediction models 122. For example, data from database 116 may be communicated to or obtained by one or both of the empathy corrections models 120 or one or more empathy prediction models 122. In some cases, model 120 may determine whether the data requires some type of empathy correction, at operation 134, and the correction may then be run through the training module 128 (and operations 130, 132, and 143 if needed to determine if the correction does in fact increase or correct the empathy of the data. In yet some cases, models 122 may output a determination as to whether a statement or other form of the data is associated with a high, neutral, or low empathy, whereby these responses may be reviewed by human operators, in some cases and corrected, if needed, at operators 132 and 134.

In some cases, the empathy correction models 120 may take data from one or data sources 102-110, such as from database 116, and may classify the data, e.g., in the form of statements or conversations, etc., as falling on an empathy sale. In some cases, the empathy scale may be a numeric scale (e./g., 1-10, 1-100, etc.), or may be a quality assessment, such as low, neutral, or high in empathy, as described in greater detail below. If a given statement of the data is determined to be below a threshold on the empathy scale (e.g., below a numeric value or classified in low in empathy), the empathy correction model(s) 120 may provide an assessment of the evaluation of the statement and provide a correction to the statement, such as through process or represented by operation 134. In some cases, the empathy correction models 120 may be trained in data from database 116. In yet other cases, the empathy correction models 120 may receive data from one or more user interfaces or communication platforms, such as email, text or instant messaging, and so on, and may provide assessments and/or corrections to that data, such as through one or more APIs 112, which may interface with the communication platform. In some cases, the assessment and/or corrections may be provided in real time, such as to enable modification of the statement or communication before it is sent by the author. In other cases, the assessment and/or corrections may be provided after the communication is sent (e.g., in near real time or at any time after the communication was sent), to enable the author to reflect upon and potentially change their communication patterns and behavior. A number of examples will be described in greater detail below in reference to FIGS. 3-5.

In some aspects, the empathy prediction models 122 may take data from one or data sources 102-110, such as from database 116, and may classify the data, e.g., in the form of statements or conversations, etc., as falling on an empathy sale. In some cases, the empathy scale may be a numeric scale (e./g., 1-10, 1-100, etc.), or may be a quality assessment, such as low, neutral, or high in empathy, as described in greater detail below, s described above with respect to the empathy correction models 120. However, instead of providing corrections to statements that are determined to be low in empathy, the empathy prediction models 122 may output one or more predictions as to what responses will follow the statement or statements that have been assessed, and where those responses will fall on an empathy scale.

In some cases, the empathy prediction models 122 may be trained in data from database 116. In yet other cases, the empathy prediction models 122 may receive data from one or more user interfaces or communication platforms, such as email, text or instant messaging, and so on, and may provide assessments and/or predictions to that data, such as through one or more APIs 112, which may interface with the communication platform. In some cases, the assessment and/or predictions may be provided in real time, such as to enable modification of the statement or communication before it is sent by the author. In other cases, the assessment and/or predictions may be provided after the communication is sent (e.g., in near real time or at any time after the communication was sent), to enable the author to reflect upon and potentially change their communication patterns and behavior.

Figure 2:
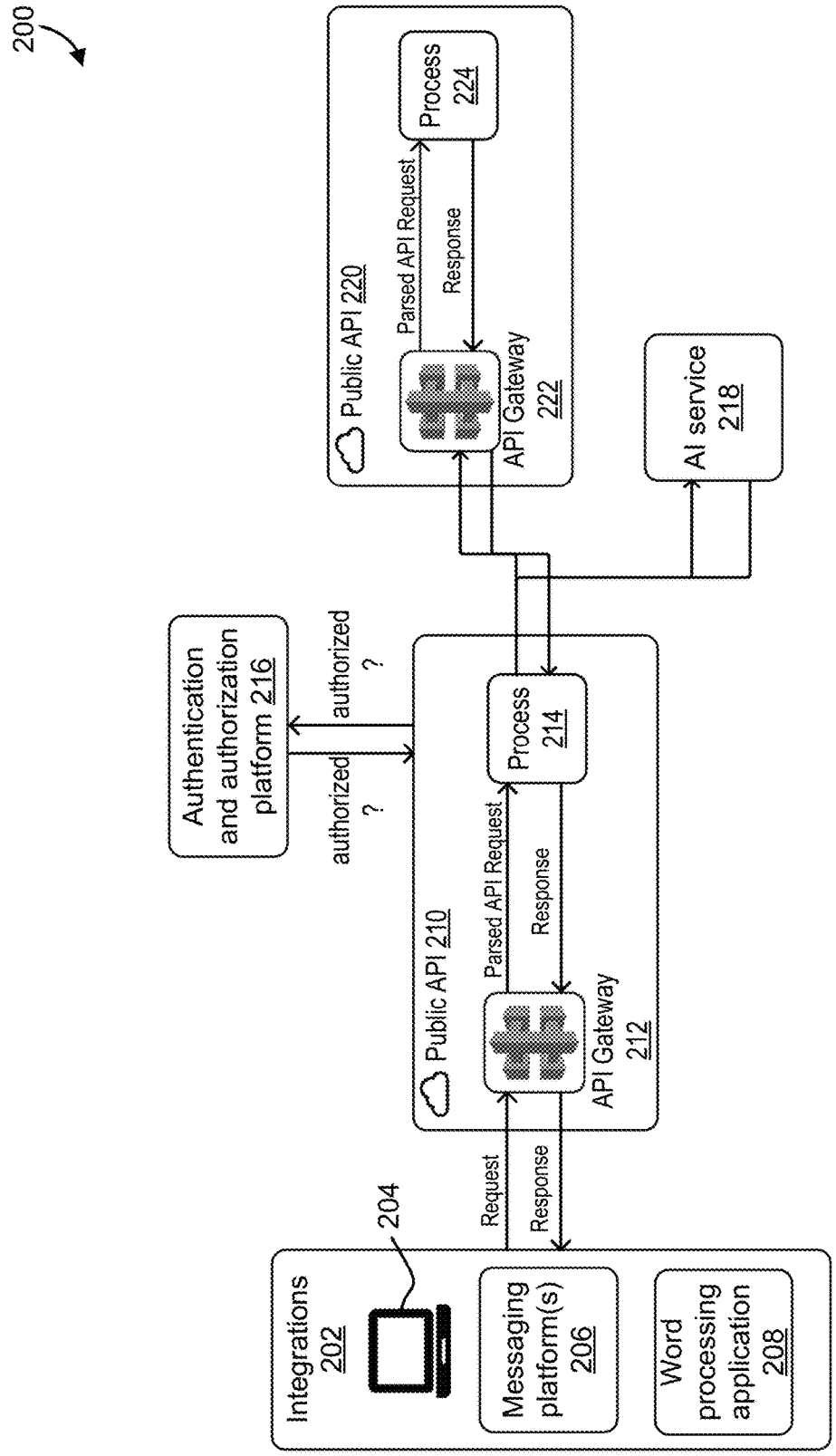
FIG. 2 illustrates another example system of data capture and modeling for evaluation, annotation, and correction of different communication modes, according to at least one embodiment.

FIG. 2 Illustrates a system architecture 200 for API integration of one or more aspects of system 100 described above in reference to FIG. 1. The system 100 and the functions it provides may be applied in several integrations including email, document correction and work collaboration as one or more APIs 210, 220.

The described system 200 may be implemented as two main pieces: a backend cloud-hosted API 224 and a frontend user interface (UI), which may be provided by one or more of integrations 202, such as email 204, messaging platform (s) 206, word processing application 2087, and/or various other applications, programs, interfaces, or hardware device (such as a keyboard or touch screen). The UI may be modified based on the platform it is being overlaid upon, such as a workspace collaboration tool (e.g. Slack), messaging platforms, videoconferencing augmentation of a transcript (e.g., Zapp), word processing application, integration into one or more applications, to keyboard, or email (e.g. Gmail). In some aspects, the UI has the ability to mark information entered by a user as in need of review, provide feedback, and allow the user to accept suggestions and make corrections on their own.

One or more APIs 210, 220 may be implemented as cloud-based services with various endpoints. A customer, user, or application can send the API data, as represented by request 226 and information about the data such as user, who is speaking, or any other type of annotation. The APIs 210, 226 may then process this data and provides a response 228, e.g., as JSON, to the end-user, system, or app. (e.g., through one of integrations 202. As illustrated, a first API 210 may include a process 214 for interfacing with an authentication and authorize platform 216, which may assess whether a user has access to the system 200. In some cases, the data included in request 226 may be passed to an artificial intelligence service (AI) service 218, which may provide and/or train one or more models, such as models 120, 122 described above in reference to FIG. 1, to be used by process 224 to assess and provide corrections and/or predictions based on an empathy assessment of the data in the request 222.

In some aspects, public APIs 210, 220, platform 216, and AI service 218 may implement one or more aspects of system 100 described above in FIG. 1. In some cases, one or more integrations 202 may be provided by system 100 and installed directly on a user device, such as may icndluign any of a variety of computing devices, such as a mobile or smartphone device, tablet, laptop, desktop computing device, and so on. In other cases, one or more of the integrations 202 may be provided as a service, or one or more networks to the user device to enable interactions between the user device and the system 200. These interactions may include one or more graphical user interfaces, such as will be described in greater detail below in reference to FIGS. 3-6, and/or may provide for access to empathy games, examples of which will be described in greater detail below in reference to FIGS. 7A-7D and 8-16.

In some examples, a user device may enable the empathy correction and/or empathy prediction functionality by installing an application/integration 202 on the user device that integrates with one or more communication applications already installed on the user device, such as an email application, one or more messaging applications, and/or various other applications. The integration 202 may detect that the user has entered a statement or phrase into the pertinent application, and send the statement and/or contextual information (e.g., prior statements in a conversation) to the system 200 through API 210. The system 200 may apply one or more models, such as obtained from AI service 218 and assess the statement(s). The API 210 may then return a suggested correction, prediction, or some type of affirmation that no correction is needed, back to the application/integration 202. In this way, communications may be analyzed and/or corrected in real time or near real time to provide for more effective communication, and/or mor empathetic communication between a user and a recipient.

Figure 3:
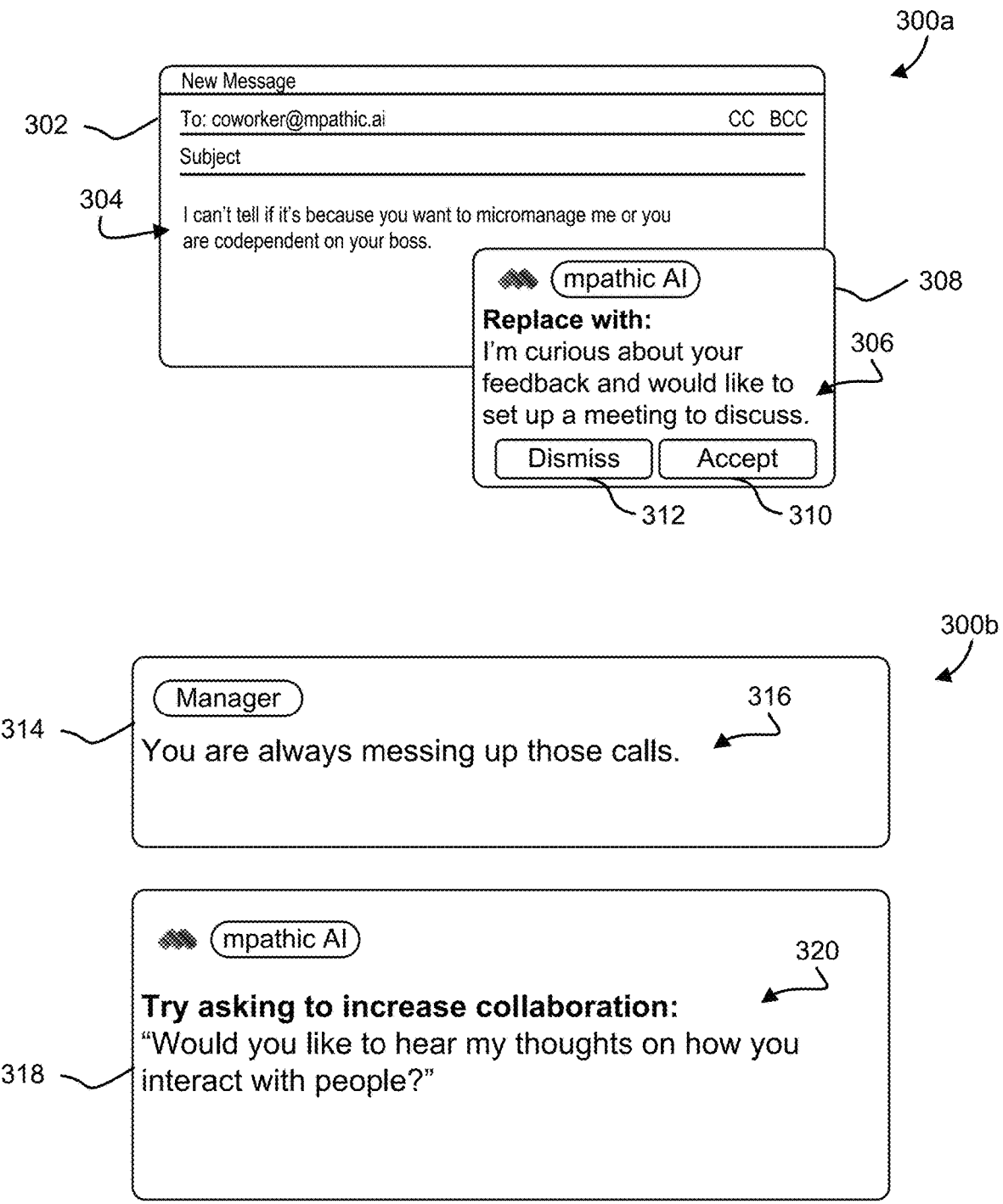
FIG. 3 illustrates an example integration of the described techniques to text and emails, according to at least one embodiment.

FIG. 3 illustrates an example user interface 300*a* that integrates empathy correction functionality with an email interface or application, represented by a compose email window 302. As illustrated, text 304 may be entered into a body of an email. In this example, one or more empathy correction models may be applied to the text 304, and a correction 306 may be displayed in another window 308. In some aspects, the correction window may include options 310, 312, to accept or dismiss the proposed correction, whereby of the accept selection 310 is selected, the text 304 may be replaced with correction 306 in the body of he email. In this way, the trained system 100 and 200 may be seamlessly integrating into existing communications interfaces to provide improvements in communication effectiveness and improve empathy in communications.

FIG. 3 also illustrates another example user interface 300*b* that integrates empathy correction functionality with a messaging interface or application, illustrated as a message window 314. Message window 314 may include message text 316. The message text may be detected and run through one or more empathy correction models, such as models 120, to assess the text 316 and provide corrections 320, in the event that an assessment of text 316 produces a low empty score. In some cases, the provided corrective text 320 may also include an indication of what communication attribute, such as collaboration, the correction is attempting to address or improve.

Figure 4:
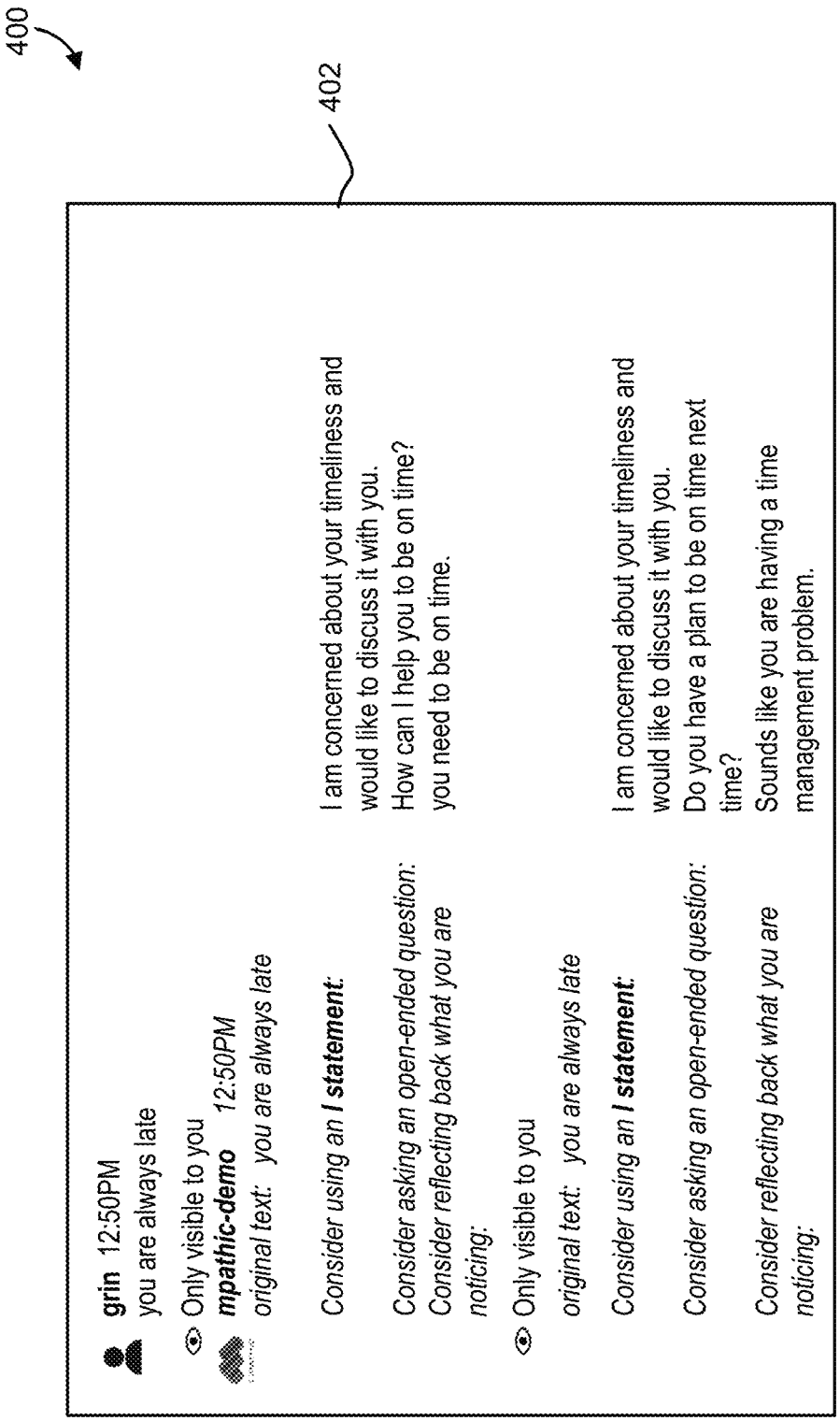
FIG. 4 illustrates an example integration of the described techniques to a messaging platform, according to at least one embodiment.

FIG. 4 illustrates another messaging interface 400 in which the described empathy correction an/or prediction techniques may be applied. In the example illustrated a statement may be entered by a user, such as "you are always late." The described systems and techniques may obtain that statement and provide one or a number of recommendations, in the form of alternative statements or questions, as to how to increase various attributes of the statement to achieve more empathic communication. In some aspects, the corrections may be displayed within a messaging window 402 (e.g., Slack or other web browser-based applications and platforms, such as Gmail, google docs, etc.). In this example, a simple REST API secured behind API keys which exposes simple model endpoints can be implemented. These endpoints can be called with textual language and a response is provided annotating the text with information about the empathy content of the language, along with recommendations and potential improvements. This API may be used to power extensions in a variety of platforms. In some examples, a messaging application may reads all messages in a channel and provides private feedback to the receiver on how they can improve their communication.

Figure 5:
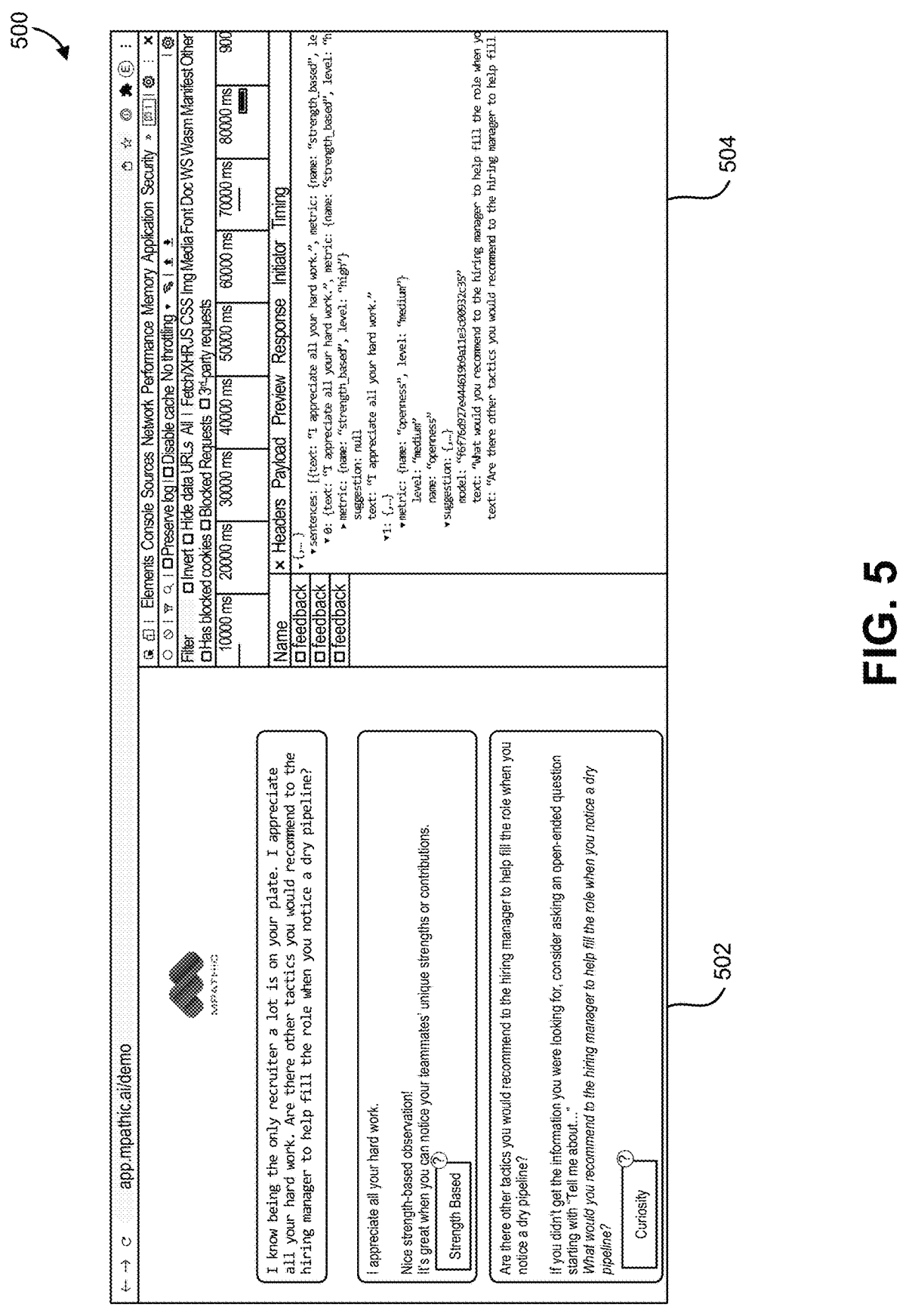

FIG. 5 illustrates an example 500 of a user interface displaying corrections to text in a messaging application window 502 with an example of an API back-end 504 with different levels for each metric and corrections for every sentence displayed next to the window 502. As illustrated, statements or text from the application window may each be displayed in a separate window or area with an analysis of the empathy assessment of each statement, including an assessment of one or more attributes of the statement, such as "strength based" and "curiosity."

Figure 6:
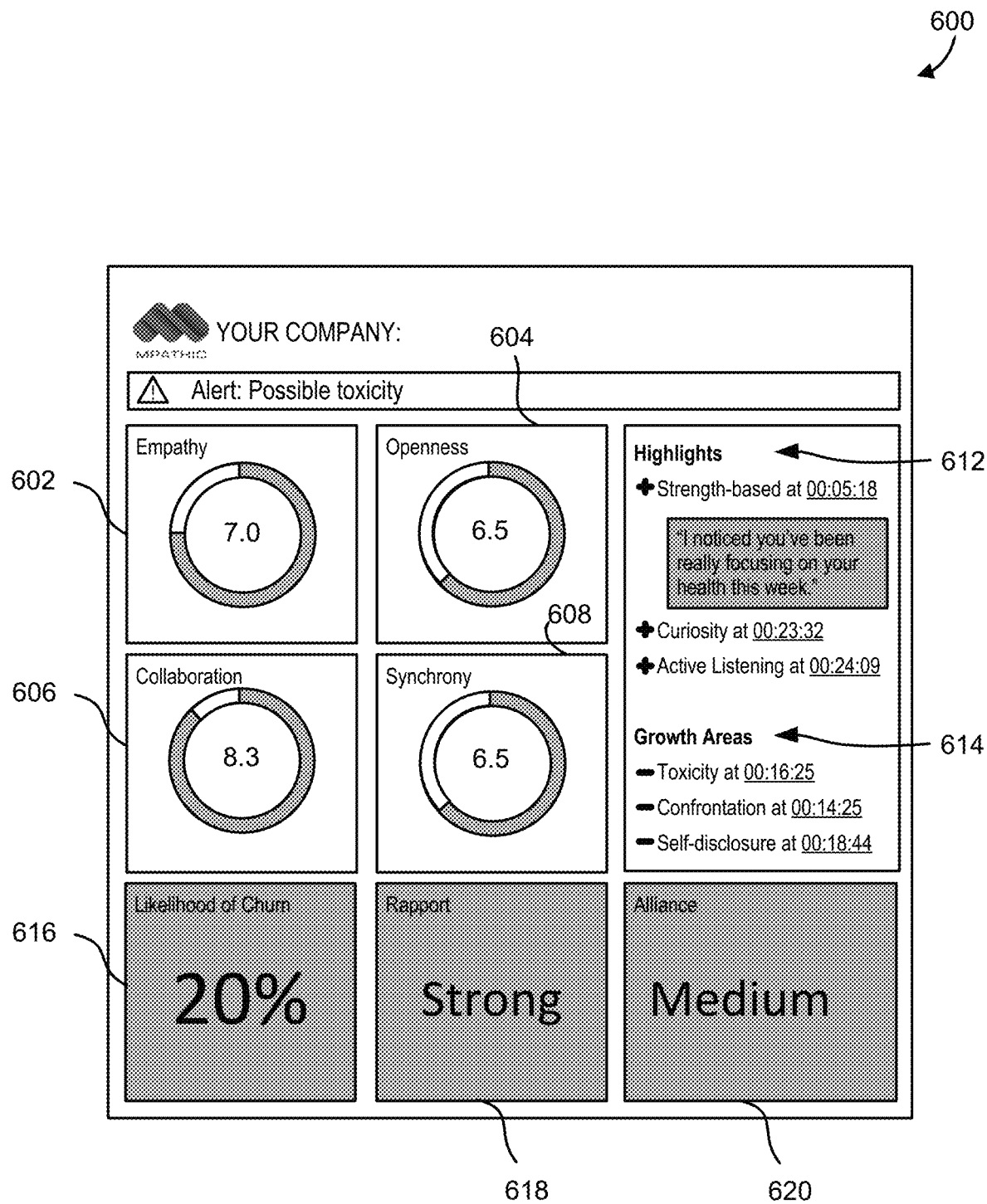
FIG. 6 illustrates an example dashboard with highlights and lowlights, which may be provided by the systems of FIGS. 1 and 2, according to at least one embodiment.
Figure 7A:
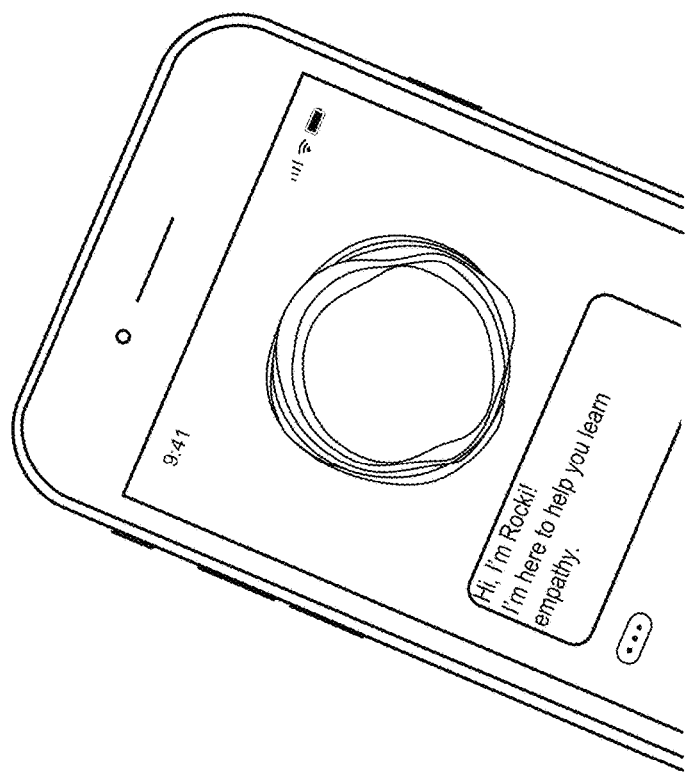
Figure 7B:
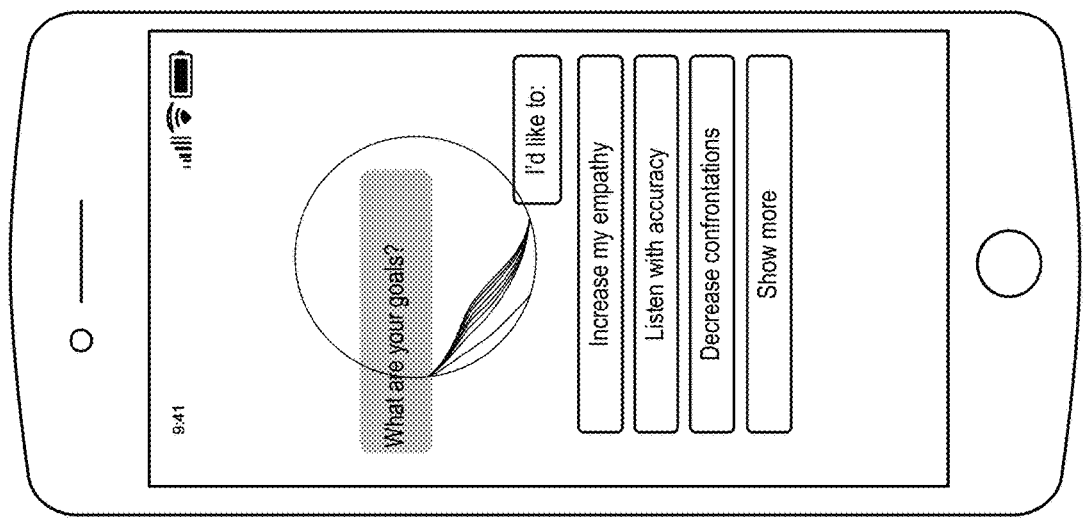
Figure 7C:
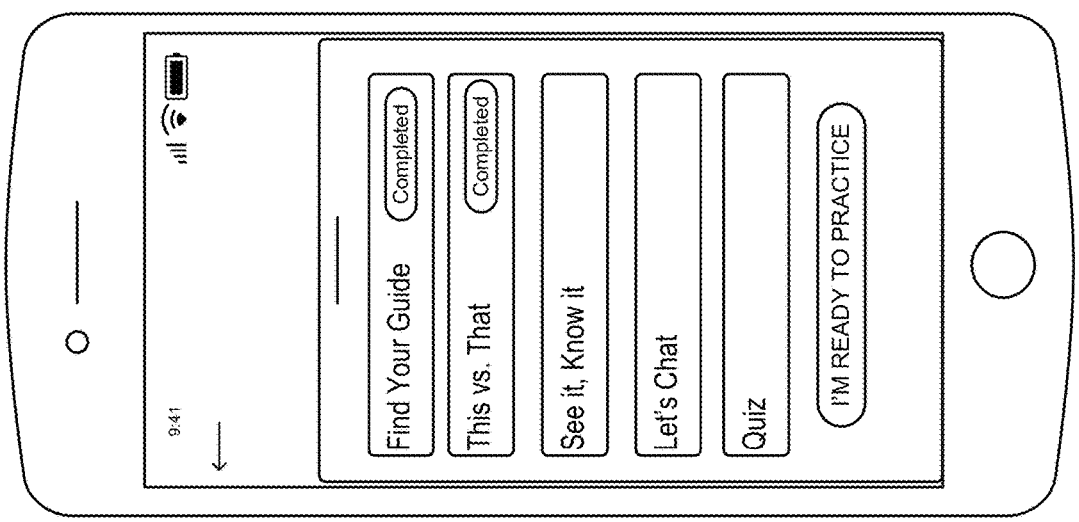
Figure 7D:
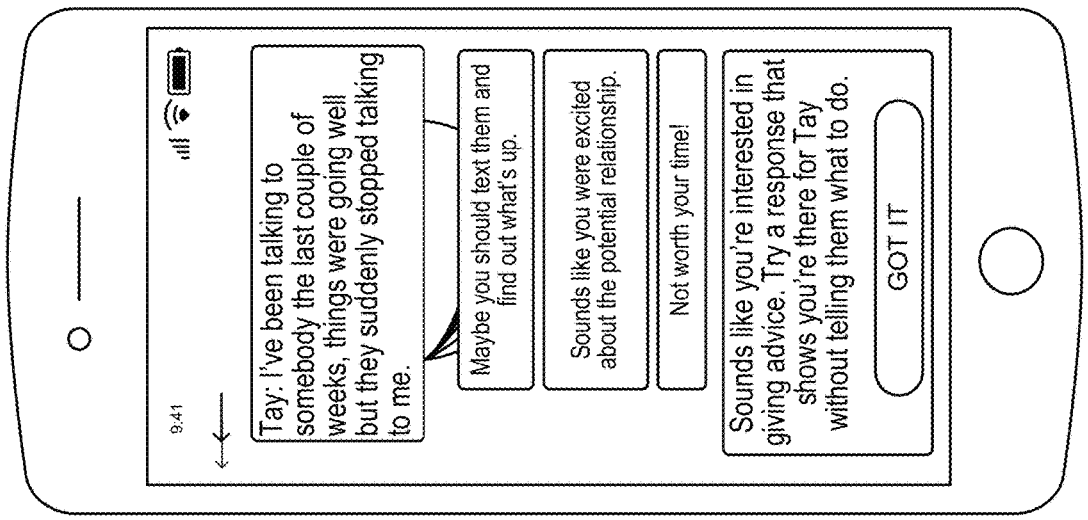

FIG. 6 illustrates an example dashboard 600 illustrating an example assessment of communications for an individual. As illustrated, various attributes of characteristics of communication by the individual may be rated and displayed as a score, such as represented via a circle out of 10, including empathy 602, openness 604, collaboration 606, and synchrony 608. The dashboard may also provide for a list of highlights 612, which may include example statements that illustrated higher empathy, and growth areas 614, which may indicate certain areas for improvement. The dashboard also illustrates, for example graphically, other metrics of attributes of the communications of the individual, such as a likelihood of churn 616 (represented as a percentage), a qualitative assessment of rapport 618, an a qualitative assessment of alliance 620 These metrics may provide useful information to an individual to aid them in achieving better, more empathic, and more effective communications. It should be appreciated that various other metrics, various other means of displaying those metrics, and various other organizational schemes may be employed to a similar effect and are contemplated herein.

A unique aspect of the described systems and techniques is that the described model is based on data that can be sourced through proprietary empathy games that are designed to elicit identify and rank empathy. FIGS. 7A-7D, and 8-16 Illustrate examples views 700*a*-700*d*, and 800-1600 of some of the basic elements of some of the games. The empathy games may offer continuing education for experts like counselors and therapists to learn the coding system and play the games to label the data. Through the empathy games, professionals may learn to improve their empathy, through corrections offered by the system, and the inputs may also be used to refine the models of the system.

FIGS. 7A-7D illustrates various views 700*a*, 700*b*, 700*c*, and 700*d* of an empathy game, which may be used to train one or more correction or predictions models, as described above. the Game illustrated in views 700*a*-700*d* may aid a professional or individual in developing reflective listening skills to become more empathic in communications.

FIG. 8 illustrates an example view 800 of a simplified menu of empathy games as may be provided by one or more user interfaces. FIG. 9 illustrates an example view 900 of instructions on ow to train therapists and other users in how to label data.

FIG. 10 illustrates an example view 1000 illustrating data labeling with an emoji scale for rating empathy or correction of empathic responses by typing free text. Note that any prompt (e.g., email or slack response) could be pulled for rating and correction. View 1000 may be an example of an interface to provide trainee responses, such as descried above in reference to FIG. 1. FIG. 11 illustrates an example view 1100 of instructions to train in reflective listening (reflections). FIG. 12 illustrate an example view 1200 of free response for users or expert labelers to demonstrate empathic listening in the form of a reflection with a hint.

Figure 13:
Figure 15:

FIG. 13 illustrates an example view 1300 of a prompt and "stem" or set of words partially auto completed or filled in for the user to demonstrate empathic listening with an open question. FIG. 14 illustrates an example view 1400 of reflection with a note indicating why the response was empathic (this is provided by the empathy engine mode or system described above). FIG. 15 illustrates another example view 1500 of a correction or prompt to direct the user to become empathic. FIG. 16 illustrates an example view 1600 of a correction when the user/expert labeler attempts to "cheat" or give a poor empathic response. Note that the similarity in words between the prompt and reflection did not indicate that this was empathic.

Figure 17:
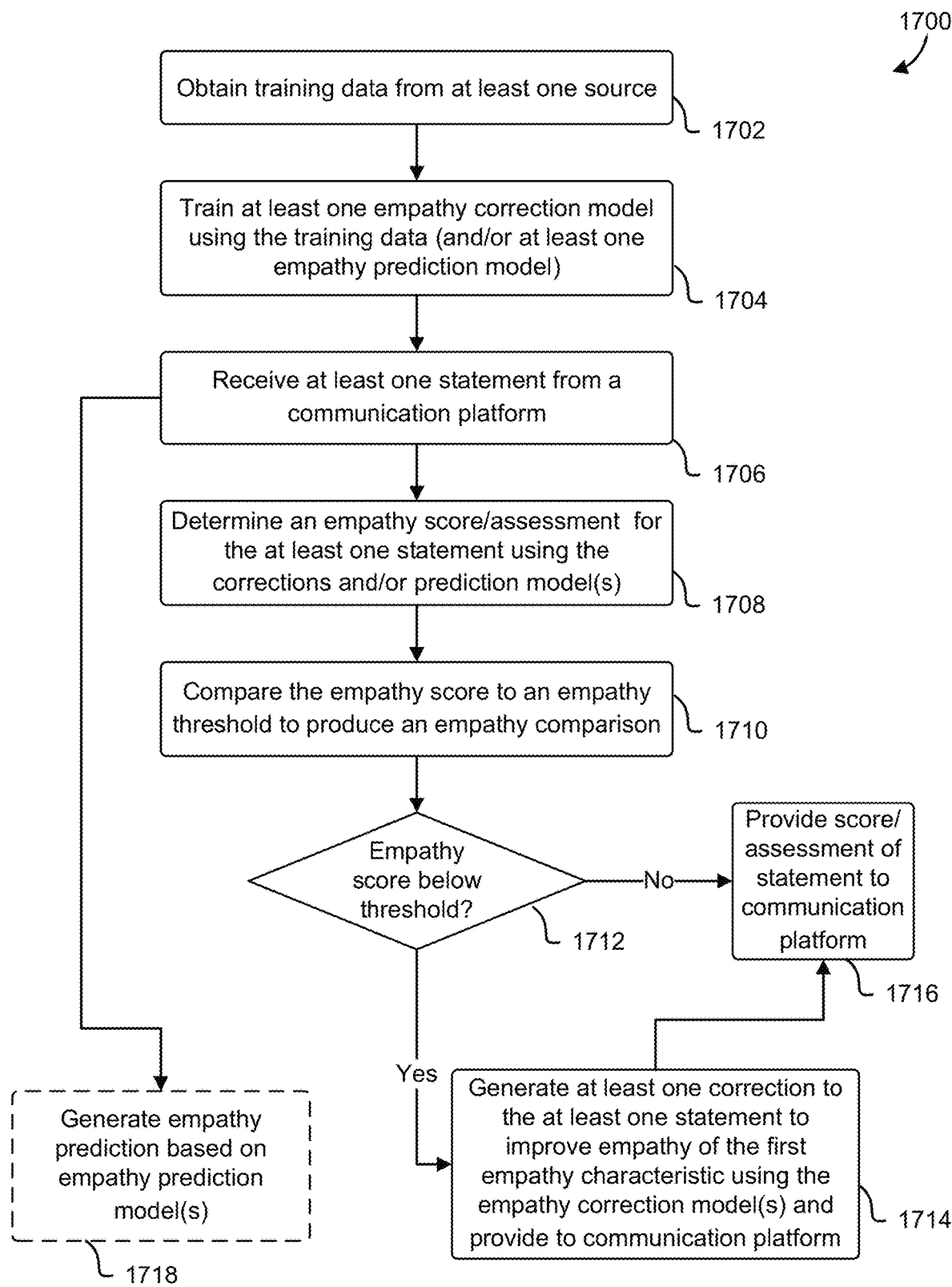
FIG. 17 illustrates an example process for performing empathy correction in communications, according to at least one embodiment.

FIG. 17 illustrates an example process 1700 for performing empathy correction in communications. Process 1700 may, in some aspects, be performed by one or more components of empathy system 100 and/or 200 described above in reference to FIGS. 1 and 2, and/or may utilize at least some of the views of a user interface described above in reference to FIGS. 3-6, and/or may utilize one or more empathy games, as illustrated and described in reference to FIGS. 7A-7D and 8-16.

In some aspects, process 1700 may being at operation 1702, in which training data may be obtained form at least one data source. In some cases, the training data may be obtained through one or more training modules or empathy games, as described in greater detail above, that elicit and obtain labels indicating an empathy score for individual statements of a plurality of statements, where the empathy score indicates at least one empathy characteristic upon which the empathy score is based. In some aspects, an empathy assessment may be substituted or added to the empathy score, where the empathy assessment includes a qualitative identification of whether the at least one statement comprises a low empathy statement, a neutral empathy statement, or a high empathy statement, and identification of at least one empathy characteristic of a plurality of empathy characteristics that forms the basis for the qualitative identification.

In some cases, training the one or more empathy correction models and/or the empathy prediction models may include obtaining training to be input into the empathy games or training modules from at least one of business-to-business user data, webscraping, psychotherapy transcripts, academic data use agreements, or therapist training data. In yet some cases, this additional training data may already be labeled, such that it does not need to (but could be), processed or re-annotated through the training modules or empathy games.

At operation 1704, at least one empathy correction model may be trained using the training data. In some cases, either alternatively or in addition to training at least one empathy correction model, at least one empathy prediction model may be trained using the training data. As described herein, the at least one empathy correction model may be sued to provide corrections or alternative language to use in communication, whereas the at least one empathy prediction model may be used to predict a response to a statement or an empathy characteristic or assessment thereof. In some cases, operations 1702 and 1704 may performed independently with and/or at any time, such as prior to concurrently with, or after the remainder of operations 1706-1718 of process 1700.

At operation 1706, at least one statement, for empathy evaluation, may be received by the empathy system, such as from any of a variety of communications or other platforms, systems, services or applications. In some cases, operation 1706 may be preceded by detecting that at least one statement has been entered into communication platform, such as by an interface or integration, such one of integrations 202 described above for a given platform, and may be sent to the empathy system. In some cases a push architecture may be employed, and in other cases, a pull architecture may be employed, upon detecting that a statement has been received by a communication platform to communicate the statement to the empathy system for analysis.

At operation 1708, an empathy an empathy score and/or assessment for the at least one statement may be determined using the corrections and/or prediction model(s). In some cases, the determined empathy score may indicate a numerical value, and/or a qualitative value as to a degree to which the statement or statements reflect empathy or characteristics thereof. In some cases, the empathy score may include an indication of a first empathy characteristic of the at least one statement upon which the empathy score is based. In some cases, an empathy assessment may include a qualitative identification of whether the at least one statement comprises a low empathy statement, a neutral empathy statement, or a high empathy statement, and identification of at least one empathy characteristic of a plurality of empathy characteristics that form the basis for the qualitative identification.

In some cases, a statement may be determined to be associated with a first empathy characteristic and a second empathy characteristic, such that a first model from empathy correction models may be selected to generate a correction for the first empathy characteristic and a second model from empathy correction models may be selected to generate a correction for the second empathy characteristic.

In some cases, the empathy score or assessment may be compared to one or more empathy thresholds, at operation 1720. In the case of a numerical score, the threshold may include a numerical value. In the case of a qualitative assessment, the threshold may include a qualitative threshold, such that a low empathy assessment may fall below a neutral empathy threshold, or a neutral empathy assessment may fall below a high empathy threshold. If the empathy score or assessment is determined to be below the threshold, at operation 1712, then process 17090 may proceed to operation 1714, in which at least one correction to the at least one statement may be generated to improve empathy of the first empathy characteristic using the at least one empathy correction model. The at least one correction may then be provided to the communication platform.

In some cases, such as when the empathy score of the statement is determined to not be below an empathy threshold, at operation 1712, or in some cases after operation 1714, the score or assessment may be provided to the communication platform, at operation 1716. The score or assessment may be provided as a comment to the statement within the communication platform, such as to inform the user of positive empathic qualities and/or suggest yet further improvements to communication to incorporate more empathic characteristics or traits. In some examples, process 1700 may additionally include providing a selection to replace the statement with the correction through the graphical user interface.

In some cases, such as when one or more empathic prediction models are trained and prediction is requested, such as through to communication platform, at operation 1718, the one or more prediction models may be used to generate one or more empathic predictions in response to one or more statements being received or obtained from the communication platform at operation 1706. In some cases, the one or more empathy predictions may also include an empathy score or assessment of the original statement and/or for the prediction. For example, a received statement may be labeled as aggressive, whereby the prediction may include a defensive statement and/or characteristics of that statement.

In yet some cases, the statement and the corresponding empathy score and/or assessment, and/or the correction may be fed back into the empathy system as training data for the empathy correction models and/or the empathy prediction models.

Behaviors Associated with Decreased and Increased Empathy

In one embodiment of this system, identification of empathic behaviors can be based on a combination and adaptation of multiple annotation systems from various evidence-based counseling like motivational interviewing and couples counseling. These annotation systems have identified behaviors that have been robustly shown to be associated with empathy, effective communication and behavior change, in addition to the opposite—lack of empathy, ineffective communication and failure to change. The identification of empathic behaviors or characteristics, as descried herein is based on the combination and adaptation of the several systems used in evidence-based counseling.

As described below, a "receiver" indicates the primary user of mpathic who is receiving corrections and receiving information such as a therapist, manager, colleague, peer, coach, counselor or teammate. A "sender" indicates the person that is being listened or responded to, in this case it may be an employee or peer or client. Many of the examples involve counseling and substance abuse; these examples would be applied to whatever context of the receiver and sender (e.g., work conflicts, termination, project roadmapping, peer feedback, discussion on slack) where the "target behavior" which in many cases in the examples is drinking or smoking) would be replaced with another behavior like decreasing truancy, increasing positive interactions at work, completing a project, etc.

The labels below would be applied to data including psychotherapy transcripts, included in the games (e.g., reflections, questions and affirmation games) to elicit responses.

In the following section, example labels of speech behaviors that are associated with high-empathy are described. These behaviors may include behaviors that are characterized by or as AFFIRM {AF}, which may include appreciation, confidence, and/or reinforcement, EMPHASIZE CONTROL {EC}, CONSENT {CNS}, FACILITATE {FA}, OPEN QUESTION {QUO}, REFLECTIONS—SIMPLE {RES} vs. COMPLEX {REC}, REFLECTION-MISSED CONTENT {REM}, MISSED REFLECTION {MISS}, and/or SUPPORT {SU}, which may include empathy, collaboration, evocation, rapport, respect, and self-exploration and/or other global codes.

AFFIRM {AF}

The receiver says something positive or compliments the sender. It may be in the form of expressed appreciation, confidence or reinforcement. The receiver comments on the sender's strengths or efforts or agrees with the sender in a way that encourages or reinforces behavior.

Appreciation: the receiver compliments the sender on a trait, attribute, or strength. The reference can be to a "stable, internal" characteristic of the sender, something positive that refers to an aspect of the sender that would endure across time or situations (smart, resourceful, patient, strong, etc.). It may also be for effort.

"You're a very resourceful person."
"Thank you for coming today."
"You've made a huge cut in your smoking."
"I've enjoyed talking with you today."

Confidence: the receiver makes a remark that bespeaks confidence in the sender's ability to do something, to make a change; it predicts success or otherwise supports sender self-efficacy. These are related to a particular task, goal, or change.

receiver: What do you think about that idea? {QUC}
sender: I don't think I can do it.
receiver: You've succeeded through some difficult changes in the past. {AF}

Reinforcement: these are general encouraging or "applause" statements even if they do not directly comment on a sender's nature, and do not speak directly to self-efficacy. They tend to be short.

"That's a good idea."
"Good for you."
"That's good."

Affirm can also have agreeing quality, particularly when it bespeaks confidence, congratulates or encourages.

"You've got a point there."

Emphasize Control takes precedence over Affirm when a receiver response could be interpreted as both.

"That must have been difficult." {REC}
"You've accomplished a difficult task." {AF} (effort/reinforcement)
"It was your decision to come here today." {EC}
"Thank you for coming today." {AF} (appreciation)

Emphasize Control {EC}

The receiver directly acknowledges, honors, or emphasizes the sender's freedom of choice, autonomy, personal responsibility. This may also be stated in the negative, as in "Nobody can make you change." There is no tone of blaming or fault-finding. Statements acknowledging the sender's autonomy in an accomplishment are coded as Emphasize Control rather than Affirm.

sender: I went for five days this week without drinking. {+}
receiver: You made that choice. {EC}
or receiver: Good for you! {AF}

Emphasize Control takes precedence over Affirm or Reflect when a receiver's response could be interpreted as both.

"It is totally up to you whether you quit or cut down."
"It's your decision."
"You know what's best for you." (No sarcasm)

Emphasize Control should not be confused with Affirm, or Confront, or Reflect. When one utterance can clearly be coded as an Emphasize Control, an Affirm or a Reflect, Emphasize Control takes precedence.

"It's great that you're doing this for yourself" {EC}
"It's your decision whether you quit or not." {EC} (freedom of choice)
sender: I'm finding this difficult.
receiver: You're the one who has to change. {CO} (negative quality)
sender: I need to make up my mind about drugs. {+}
receiver: You're ready to make a decision. {RES} Can I share with you the strengths
I've seen you demonstrate? {EC} {QUC}
sender: Since I'm quitting, I won't allow smoking in the house.
receiver: You're setting your own goals and boundaries. {EC} (not reflect)

Related, if multiple codes exist in a long run-on sentence, again, Emphasize Control takes precedence.

"Okay. {FA} So, I know, um, correct me if I m wrong, but when we talked about I think maybe November or December you were stressed due to your son." {EC}

Note: Emphasize Control here takes precedence over the Complex Reflection

Consent {CNS}

The sender provides voluntary approval or assent to receive advice, participate in an exercise, or treatment.

"Okay. {FA}. You seem to be feeling anxious {RES} Is it okay if we do a breathing exercise {EC}?
"Yes, I would like that." {CNS}
"No I'm okay right now" {no code}

Consent typically occurs after a label of EC. Do not label as consent if the sender is not explicitly providing approval or assent. Consent would not be labeled if a sender is answering an open or closed question in the affirmative.

"Your birthday is in April, righ?" {QUC}
"Yes, my birthday is in April"

Facilitate {FA}

These are simple utterances that function as keep going acknowledgments. These occur frequently throughout a counseling or clinical interview.

"Mm Hmm."
"OK."
"Tell me more."
"I see."

Facilitate responses are stand-alone utterances. They do not usually occur with other receiver responses in the same volley. Do not code as Facilitate if the vocal sound is a preface to some other receiver response like a Question or a Reflection. In these combinations, code only the second response. No Facilitate would be coded for: "OK, well let's get started with these questionnaires, then." This is a Structure code. Do not code as Facilitate if the vocal sound serves as a time holder (uh . . . ) that serves to delay the sender's response, rather than having the "go ahead" function. When stand alone as sentences, these are lumped in with previous or next utterance (see section above on Lumping Codes). If these are comma separated, code the entirety of the sentence. For example:

receiver: Uhhhhhh, I think it's about four standard drinks. {GI}
receiver: Uhhhhhh. {R-DWN}
receiver: I think it's about four standard drinks. {GI}

In videotape coding, do not code a head-nod or other nonverbal acknowledgment as Facilitate, unless it is accompanied by an audible utterance. A receiver may make an utterance that sounds like a Facilitate but has a negative or sarcastic quality. It must unambiguously disagree, question the sender's honesty, express sarcasm, etc. These have a "Hah!" or "Aha!" or cynical "Yeah, right!" quality. Code as Confront.

Open Question {QUO}

An open question is coded when the receiver asks a question that allows a wide range of possible answers. The question may seek information, invite the sender's perspective, or encourage self-exploration. These questions often seek elaboration or demonstrate curiosity on the part of the receiver. Note: Open Question need not be in the form of a question. "Tell me more", is an Open Question. These are all examples of Open Questions:

"How might you be able to do that?"
"How do you feel about that?"
"In what ways has being overweight caused problems for you?
"Tell me about your smoking."

Reflections—Simple {RES} Vs. Complex {REC}

A reflection is a reflective listening statement made by the receiver in response to a sender's statement. It can reflect sender utterances from the current or previous sessions. Reflections capture and return to the sender something that the sender has said. Reflections can simply repeat or rephrase what the sender has said or may introduce new meaning or material. Reflections can also include observations on how the sender is appearing in the room in the moment or process comments about the interaction Reflections can summarize part or all of a session. Information that was provided by the sender in a questionnaire or on an intake form can be coded as Reflect as long as it does not give the sender new information. Reflections require sub-classification as either Simple {RES} or, Complex {REC}. They are also classified by the level of accuracy. When a coder cannot distinguish between a Simple and Complex Reflection, the Simple Reflection is the default category.

Simple Reflections {RES}

Simple Reflections add little or no meaning or emphasis on what the sender has said. Simple reflections merely convey understanding or facilitate sender/receiver exchanges. Simply repeating or rephrasing what the sender has said qualifies as a Simple Reflection. They may identify very important or intense sender emotions but do not go far beyond the original overt content of the sender's statement.

Complex Reflections {REC}

Complex Reflections typically add substantial meaning or emphasis to what the sender has said. They convey a deeper or richer picture of the sender's statement. They contain significantly more or different content from what the sender actually said. Additionally, the receiver may add subtle or obvious content or meaning to the sender's words. The following are almost always Complex Reflections: analogy, metaphor and simile (not stated by the sender), exaggeration or amplification by understating or overstating, "continuing the paragraph" by anticipating of what the sender might reasonably say next, double-sided reflection containing both sides of ambivalence in a single reflect, tentative hypothesis testing ("I wonder if, if I have it right . . . ), reframing what the sender said (e.g., turning a negative statement into a positive one), and a strongly compassionate reflection that demonstrates understanding and empathy to the sender (e.g., "That must have been difficult.").

The final utterance that ties together a summary is usually coded as Complex Reflection. Sometimes summaries include a series of simple reflections followed by a complex reflection. Sometimes they are comprised of all complex reflections.

Reflection-Missed Content {REM}

Coded when the structure of the statement is that of a reflection but the content is not accurate to what the sender shared. The receiver is attempting to demonstrate understanding; however, they are not accurate in their responses. Intentional exaggeration or amplification of a sender's emotions should be labeled as {REC}. Typically, the sender will offer a correction or additional explanation.

Missed Reflection {MISS}

Coded when the sender offers feelings words or describes an experience and the receiver does not respond or make an attempt to respond to the offered information. Miss should only be coded if the speaker responds in a way that shows they did not respond to what the receiver was sharing. Miss should not be confused with confrontations, questions. If the structure of the response is a reflection but the content is inaccurate, use the code REM. Note: when the receiver says "sounds like" or "seems like" this is often a marker for a reflection. Examples of Reflections (Simple and Complex):

Example 1:
  sender: I wouldn't mind coming here for treatment but I don't want to go to one of those places where everyone sits around crying and complaining all day.
  receiver: You don't want to do that. {RES}
  or receiver: So you're kind of wondering what it would be like here. {REC}
Example 2:
  sender: The court sent me here.
  receiver: You are court-mandated to be here today. {RES}
  receiver: That's the only reason you're here. {REC} (amplification)
Example 3:
  sender: At one time I was pretty much against anything but marijuana.
  receiver: Marijuana was OK then. {RES}
  receiver: That's where you drew the line. {REC}
Example 4:
  sender: Everyone's getting on me about my drinking.
  receiver: Kind of like a bunch of crows pecking at you. {REC} (simile)
Example 5:
  sender: I don't like what smoking does to my health, but it really reduces my stress.
  receiver: On the one hand you're concerned about your health, on the other you need the relief. {REC} (double-sided)
Example 6:
  sender: I don't like what smoking does to my health, but it really reduces my stress. {-}
  receiver: On the one hand you're concerned about your health, on the other you need the relief." {REC} (double-sided)
  receiver: You don't like what smoking does to your health, but it's a stress-reducer. {RES} (does not add to what the sender just said)
Example 7:
  sender: I'm a little upset with my daughter.
  receiver: You're really angry at her. {REC} (overstates)
  Note: A reflection is still coded as Simple or Complex Reflection even if the receiver's voice inflects upward at the end (a "near reflection"). You may opt to stack a question code to indicate the question nature of the reflection: {RES} {QUC} or {REC} {QUC}. The Reflect must be identical in all respects to a statement, except for the voice inflection at the end.
  sender: I'm OK drinking during the week, but I really drink a lot on the weekends.
  receivers: You're OK except on the weekend. {REC}
  or receiver: You're OK except on the weekend? {RES} {QUC}
    sender: I've tried to quit, but maybe I haven't tried hard enough.
  receiver: You've tried hard at this in the past and continue to show determination. {REC}
  or receiver: You've tried hard at this in the past and continue to show determination, right? {REC} {QUC}
Examples of Reflections: REM and MISS
  Receiver: How are you feeling about the interview today? {QUO}
  Sender: I'm feeling nervous. I don't want to mess anything up.
  Receiver: Let's jump right in and get started with the interview {MISS}
  Receiver: What do you feel nervous about? {QUO}
  Receiver: Sounds like some nervous excitement about today's meeting {REM}
  Sender: Nothing I say seems to matter. I just wish people would listen to what I'm saying.
  Receiver: Sounds like you feel the need to speak up more. {REM}
  Sender: Well, not quite.

Support {SU}
  An attitude or response of acceptance or reassurance displayed by the sender toward the receiver. Support need not capture or restate what a receiver has shared. They have a sympathetic undertone, an agreeing quality, or aim to normalize a receiver's experience.
    Receiver: "I'm having such a hard day"
    Sender: "I understand what you mean" {SU} (agreement)
    Sender: "I'm sorry to hear that" {SU} (sympathy)
    Sender: "It's really normal to feel sad sometimes." {SU}
    Sender: "Seems like you're having a bad day." {RES}
    Sender: "You've made it through difficult times before" {AF}
  If the sender restates what the receiver has shared, reflections take precedence. Some expressions of support might also mirror giving information, see the third example above. When there is a clear purpose of offering reassurance, support takes precedence. Differentiate from Affirm. If the sender's response has a complimentary quality, or bespeaks appreciation, confidence or reinforcement, then Affirm takes precedence.

Sprinkle Coding
  Sprinkle codes are localized instances of global or gestalt sense including all efforts of the receiver to show empathy, collaboration, evocation, rapport and other global codes listed below.

Empathy
  Receiver shows accurate understanding of senders worldview and makes active repeated efforts to understand their point of view or shows evidence of deep understanding beyond what is said to what is meant. receiver behaviors where they adeptly use complex reflections in a manner that both capture what the sender just said and potentially extend the meaning even further. Examples include: receiver effectively communicates an understanding of the sender beyond what the sender said, showing great interest in sender's perspective or situation, attempting to "put self in sender's shoes," often encouraging sender to elaborate, beyond what is necessary to merely follow the story, and using many accurate complex reflections. Some examples may include:
    T: So, in some ways it's like, the fuse feels shorter, your reaction feels less predictable to you.
    T: So you're looking out for yourself. You know this is a big fear. You know this is a, a trigger.
    T: I think you've been through a lot in your life to know—That this is something that you can overcome.
    T: It makes you a little bit anxious, obviously, 'cause you did your avoidance by ditching Collaboration
  Collaboration can be tricky to identify, as it can be subtle, but for the localized brownie coding of Collaboration we can rely on the "4" and "5" rating descriptions in the global rating. Instances where the receiver shares the power of the session and incorporates sender input are examples of Collaboration. Instances where the receiver emphasizes the sender's control (EC) within the session (not externally) or queries for sender input (agenda setting or in discussion) should be marked with the Collaboration brownie. Examples include: actively structures session in a manner that facilitate sender input, querying sender ideas, incorporating sender suggestions, actively "mines" for sender input, explicitly identifying sender as the expert, and tempers advice giving and expertise depending on sender input.

Note: If a question has both Collaboration and Evocation qualities (e.g., "What would you like to work on in today's session?) we always prioritize Collaboration. Some examples may include:

T: It sounds like you have a lot on your plate and want to discuss today. Where should we start?
T: What would be helpful for us to work on today?
T: Let's work on that together today
T: What, what else do you need help with ?

Evocation

For Evocation, we want to highlight clear instances where the clinician elicits the sender's opinion and views. Think clinician curiosity and exploring sender views *and* drilling down to further explore a potential topic of discussion. In MI based sessions, these are instances where the clinician elicits language in favor or change and explores sender ideas and potential actions for change. Typically, these will likely take the form of well stated Open Questions and deepening Complex Reflections. Examples include: curious about sender's ideas and experiences (in MI sessions, especially regarding target behavior), does not miss opportunities to explore topics more deeply with the sender, seeks sender's ideas about change and motivation. In MI sessions, evocation highlights sender's ideas towards target behavior, reinforcing and eliciting change-talk, and ideas about change. Some examples may include:

T: So, tell me a little about what you don't like about it.
T: So how has your relationship with God played a role in your recovery ?
T: How do you imagine your life would look if your problems magically disappeared. (this is an example of a miracle question)

Contempt (Lower Empathy)

The Contempt brownie should be used when the receiver shows clear disregard for the sender. This is similar to the "1" rating on the Acceptance global. Instances of Contempt ideally should be rare, however, when they occur, we want to make sure to capture them as this is the worst of behaviors that a receiver can exhibit. Any instance of the receiver demonstrating any instance of the following should be labelled as contempt: expressing open hostility toward, a judgment of, or disregard toward the sender, dismissing the sender's ideas or opinions out of hand, or remarking on the sender's weaknesses, or labeling the sender. Some examples may include:

T: Those are really silly ideas and it seems like you haven't thought this through at all.
T: Sounds like you were being a little twerp. :-( Rapport Rapport is represented by mutual attentiveness, positivity, and coordination in interactions between the sender and the receiver. This is a mutual form of attunement between the sender and receiver. For rapport, we want to highlight clear instances where the sender and receiver are attuned to one another. Examples might include: finishing one another's sentences in quick succession, sharing jokes, mutually offered affirmations, or a lexical cue such as "your demeanor changed. What was that about."

Respect

The sender and receiver demonstrate an attitude or behavior of honor, regard, concern, and other positive qualities towards one another. This bidirectional process can serve an important purpose in interpersonal relationships. Examples might include: actively inviting another's input or opinion, obtaining and providing consent, or expressions of support and care.

Self-Exploration

The sender engages in active intrapersonal exploration, openly exploring values, problems, feelings, relationships, fears, turmoil, life-choices, and perceptions. senders may experience a shift in self-perception. Note: We code as many high-points of sender self-exploration occur during the session. Previous teams selected a single high-point, but we want to capture them all. Examples include: sender speech provides a connected chain of thoughts when referencing the problem and potential solution, sender relates new insights into his/her own thought processes or actions, sender may express emotion such as excitement or distress at a new self-perception, sender shows a marked shift from prior defensiveness to open exploration of a problem and its possible solutions. Some further examples are provided below:

P: And then I start really criticizing my personality, my character, the way I am, the, my, I, I probably . . . my emotions, my fears, you know, but I, actually there's more things to add to this, because I've been thinking about it more.
P: You know, sometimes I know I just have to face it.
P: It, I . . . And now that I've really seen how deep that I can get in a dark place as a result of this, I'm fearful that it's just like right around the corner anytime.
P: And when I least expect it something will happen that will provoke that out of me.

In the following section, example labels of speech behaviors that are associated with lower empathy are described. These behaviors may include behaviors that are characterized by or as ADVISE {AD}, CONFRONT {CO}, which in some aspects can include as examples, anger, belligerent, contempt, and/or criticism, DIRECT {DI}, CLOSED QUESTION {QUC}, RAISE CONCERN {RC}, ANGER {ANG}, BELLIGERENT {BE}, CONTEMPT {CPT}, CRITICISM {CRIT}, DEFENSE {DF}, DISGUST {DG}, DOMINEER {DR}, and/or STONEWALL {SW}.

Advise {AD}

The receiver gives advice, makes a suggestion, or offers a solution or possible action. These will usually contain language that indicates that advice is being given: should, why don't you, consider, try, suggest, advise, you could, etc. Advice is a form of giving information. Advice is when a receiver suggests ways to change behavior.

If advice or constructive criticism is given with permission then we automatically code that question in which the receiver asks for permission as a stacked Emphasize Control {EC} and Closed Question {QUC}. The advice coming after that initial request for permission is still coded as {AD}. Advice with permission is a classic motivational interviewing construct. Subcategories include the following.

Constructive Criticism {ACC}: Coded when the receiver provides specific suggestions on how the receiver could change a behavior and/or notes how the change will be of impact. In this example, the receiver is offering a suggestion for how the sender can share more in meetings rather than simply suggesting a behavior change:

receiver: "You should participate more in meetings. Perhaps sharing at the beginning of meetings will allow you space to share your thoughts."{ACC}
receiver: Would it be ok if I shared my opinion? {EC} {QUO}
sender: Sure.

receiver: I suggest that you find something else to do on Friday night than attend that party. {AD}

Separate from asking for permission, below are examples of receiver AD:

"Consider buying more fruits and vegetables when you shop." {AD}

"You could ask your friends not to drink at your house." {AD}

"You should focus more on your children's sleep habits if you want them to misbehave less." {AD} receiver: Would you be interested in exploring some different options for, for making a change? {QUC}
sender: Yeah. {+}
receiver: Okay. So um, and you can talk to your doctor more about this but you know of course there's, there's always to option to, you know, just, just quit and see what happens-{AD}
sender: Mhmm. {FN}
receiver: In your life and just, kinda go from there. {AD} Um, you know another option would be to, you know, to slowly cut back your use. {AD}

Advise should not be confused with Direct or Question. Some examples may include:

"Don't let your friends drink at your house." {DI} (imperative)

"Could you ask your friends not to drink at your house?" {QUC}

"What could you ask your friends to do to help you?" {QUO}

Confront {CO}

These are the expert-like responses that have a particular negative-parent quality, an uneven power relationship accompanied by disapproval, disagreement, or negativity. There is a sense of "expert override" of what the sender says. The receiver directly disagrees, argues, corrects, shames, blames, seeks to persuade, criticizes, judges, labels, moralizes, ridicules, or questions the sender's honesty. Included here are utterances that have the form of questions or reflections, but through their content or emphatic voice or tone clearly constitute a roadblock or confrontation. In instances where the question is confrontative (e.g., "What were you thinking?") stack Confront with Open Question. If you are in doubt as to whether a behavior was a confront or another code, do not code it as Confront. Re-emphasizing negative consequences that are already known by the sender is a Confront, except in the context of a Reflection. The Reflection restates information presented by the sender and is merely reflected back to the sender without disapproval or negativity. Some examples may include:

sender: I can't believe they took my license away.
receiver: You knew you'd lose your license and you drove anyway. {CO} (criticizes)
sender: I looked for a job this week.
receiver: Sure you did. {CO} (disbelieving, sarcastic voice tone)
sender: I thought when I got pregnant I'd quit smoking for the baby, but I haven't.
receiver: You're willing to jeopardize the baby's health just for cigarettes." {CO} (judgmental, shaming, re-emphasizes consequences not voiced by the sender)

Do not confuse Confront with Reflect or Question or Facilitate. Confront should be unmistakably confrontational. A subtle inference is not a sufficient reason to code a receiver's behavior as Confront. If a question has a sarcastic tone, code it as a stacked Confront & Question as referenced above. Some examples may include:

sender: I don't really have a problem with alcohol.
receiver: Drinking really hasn't caused problems for you. {RES}
sender: I don't really have a problem with alcohol.
receiver: Drinking really hasn't caused problems for you. {RES}
or receiver: So YOU think that you don't have any problems AT ALL! {CO} (conveyed by a sarcastic tone in vocal emphasis)
sender: I can't believe I missed work and blew a good job just to party.
receiver: It seems like a high price to pay for a good time. {REC}
or receiver: Well, surprise surprise! Imagine that! {CO} (sarcasm)
sender: I don't care if I lose my job because I drink too much. {-}
receiver: It really doesn't matter to you. {RES}
or receiver: Losing your job is a pretty high price to pay for having a good time" {CO} (disagrees)
sender: I don't care if I lose my job because I drink too much. {-}
receiver: It really doesn't matter to you. {RES}
or receiver: Losing your job is a pretty high price to pay for having a good time" {CO} (disagrees)
sender: I feel kind of run down.
receiver: Don't you understand what drinking is doing to your health? {CO}
or receiver: Do you think alcohol is affecting your health? {QUC} (not sarcastic in tone)
or receiver: "Do you think that alcohol might be responsible, maybe? {CO} {QUC} (sarcastic tone)
sender: I didn't drink all weekend.
receiver: So you say, tell me another one. {CO} {QUO}
or receiver: Hm-hmm {FA}

Occasionally a Confront can masquerade as an Affirm.

sender: I'm doing a little better, I guess, but I feel like it's pretty hopeless.
receiver: But look how much progress you've made! {CO} (disagreement)
or receiver: You can see some progress, but mostly you're discouraged. {RES}

Direct {DI}

The receiver gives an order, command, or direction. The language is imperative. Examples of this trait include:

"Don't say that!"
"Get out there and find a job."
"You need to fax those forms asap."

Phrases with the effect of the imperative tone include

"You need to _____."
"I want you to _____."
"You have to _____."
"You must _____."
"You can't _____."
"I want you to watch this video."
"You've got to stop drinking."
"You must have more respect for yourself"

Direct should not be confused with Affirm, Advise or Confront.

"You could try looking for a job this week." {AD}
"I want you to try to find a job." {DI}
"There's no reason for you not to be working." {CO}
"You should be proud of yourself for finding a job." {AF}
"Now get out there and get a job!" {DI}

Closed Question {QUC}

The question implies a short answer: yes or no, a specific fact, a number, etc. The question specifies a restricted range or satisfies a questionnaire or multiple-choice format. The grammar in the question likely identifies the closed nature of the question (e.g., a question stem of 'can', 'do', and 'are')—and often it can be answered by yes or no or restricted range. Note: It does not matter what the intent or sender response actually is. (e.g., if they respond to a yes or no question with a long story, the question is still coded as closed). All of these are examples of Closed Questions:

"Did you use heroin this week?" (Yes or No answer)
"Where do you live?" (Specific fact)
"Do you want to stay where you're at, quit, or cut down?" (Multiple choice)
"On a scale from 0-10 how motivated are you to quit?" (Restricted range)

When the receiver or sender adds "right" or "you know" to the end of the utterance and there is an upward inflection implying a question, stack the codes beginning with the initial code from the primary utterance, and then the question code.

It has been a struggle for you, right? {REC} {QUC}
It is your call if you want to follow-up on that appointment, you know? {EC} {QUC}

Raise Concern {RC}

The receiver either points out a possible problem with a sender's goal, plan, or intention, and contains language that marks it as the receiver's concern (rather than fact). Or, the receiver provides a warning or threat, implying negative consequences unless the sender takes a certain action.

This may not seem important to you, but I'm worried about your plan to move back to your old neighborhood. {RC}
Is it OK if I tell you a concern that I have about that? {EC} I wonder if it puts you in a situation where it might be easy to start using again? {RC} {QUO}
I'm worried that you may have trouble when you're around your old friends. {RC} I think you may wind up using again with your old friends. {RC}
sender: What do you think of that idea?
receiver: Well, frankly it worries me. {RC}

The receiver provides a warning or threat, implying negative consequences unless the sender takes a certain action. It may be a threat that the receiver has the perceived power to carry out or simply the prediction of a bad outcome if the sender takes a certain course.

"You're going to relapse if you don't get out of this relationship." (implies negative consequences)
"You could go blind if you don't manage your blood sugar levels." (warning)
"If you don't come to our sessions I'll have to talk to your parole officer." (threatening)

Advise is coded when the receiver is suggesting a form of action. Whereas Raise Concern does not advise a course of action, but rather points to a potential problem or issue for the sender's consideration. Related, in Giving Information the receiver provides factual information that is not identified as a concern. Confront involves direct disagreement, argument, criticism, shame, blame, judgment, moralization, disapproval, etc. Confront has a particular negative-parent quality that acts as a roadblock or confrontation. Confront contains language that implies the concern as "fact" rather than opinion or concern. Raise Concern contains language that identifies it as the receiver's concern only.

"I'm worried that you'll use drugs when you're bored." {RC} (no advice given)
"You could ride your bike when you get bored." {AD} (makes a suggestion)
"I've been concerned about you this week." {GI}
"Boredom and high stress are common triggers for drug use." {GI} (if the context does not imply Warn)
"How will you keep on track when you go back home?" {QUO} (not RC or Confront)
"There's no way your plan will work if you're around your old friends." {CO} (factual statement)
"I'm concerned that you are an alcoholic." {CO} (labeling)

Warning statements should always be identified as containing a threat or implied negative consequences. These need to be differentiated from Advise, Confront, and Direct. The following examples do not imply negative consequences.

"You should consider leaving your partner." {AD} (suggestion)
"There's no reason for you to neglect your health." {CO} (shames)
"You have to come to our sessions." {DI} (lacks consequences to be RC)
"One of the health risks for diabetics is blindness." {GI} (true data on health risk about diabetics)

The following code are from Gottman's SPAFF, taken from Coan, J. A., & Gottman, J. M. (2007) (The specific affect coding system (SPAFF) is from the Handbook of emotion elicitation and assessment, 267), and have been modified and adapted for use by the described systems and techniques. Many of the following are specific instances or subcodes for Confront {CO} and all are associated with low empathy.

Anger {ANG}

Angry affect without belligerence, contempt, defensiveness, disgust or attempts to dominate. Examples
1. Frustration. Lower pitch and tempo of voice.
2. Angry "I-statements." like "I am so angry!" or "I am so frustrated right now!"
3. Angry questions. Questions asked with angry affect and usually with sharp exhalations, as in "Why?!"
4. Commands. Sharp exhalations and strong angry and affect frequently accompany commands. Examples include "Stop!" or "Don't speak to me like I'm a child!"

Belligerent {BE}

The function of Belligerence is to "get a rise" out of the sender through provocation of anger. The belligerent receiver is, in a sense, looking for a fight. Examples
1. Taunting questions. These are questions whose function is to irritate or confuse the sender. E.g. "Why?" in the context of a serious discussion. Struggling to suppress a smirk while asking taunting questions as the sender becomes increasingly enraged.
2. Unreciprocated humor. Sometimes, the belligerent receiver appears to actually believe he or she is being funny, even though the sender is obviously annoyed.
3. Interpersonal terrorism. Posing direct challenges to the agreed-on rules or boundaries of the relationship, Example, "What would you do if I did?" or "What are you going to do about it?" Or loud commands such as "Don't interrupt me!" as a means of demonstrating his or her power.

Contempt {CPT}

Examples of this trait include:
1. Sarcasm. Sarcasm in conversation frequently precedes derisive laughter at the sender's expense or manifests as a ridiculing comment regarding something the sender has said. Frequent examples include the ironic use of such statements as "sure!" or "I'll bet you did!"

2. Mockery. When receivers mock, they repeat something the sender has said while exaggeratedly imitating the sender's manner of speech or emotional state for the purpose of making the sender look ridiculous or stupid.
3. Insults. Insults are active and straightforward forms of contempt—they are shows of disrespect for the sender through obvious verbal cruelty.
4. Hostile humor. Often, the contemptuous receiver uses a form of unshared humor that, though an apparent joke, utilizes sarcasm, mocking, or insults to achieve the aim of contempt. By delivering such messages as a "joke," the receiver may be attempting to leave him- or herself an "out" (as in, "hey, I was only joking"). Hostile humor can be momentarily confusing for coders and senders alike. The contemptuous receiver may laugh heartily, and sometimes the sender will briefly and reflexively laugh along.

Criticism {CRIT}

Examples of this trait include:
1. Blaming. In blaming, one individual assigns fault to another, along with a personal attack or global accusation, as in "the reason the engine blew up is that you never put oil in it."
2. Character attacks. Often expressed as "you never/you always" generalizations, character attacks are critical of a person's personality or abilities in very general ways. Examples include statements such as "you don't care," "you always put yourself first," and so forth.
3. Kitchen sinking. This is essentially a long list of complaints. Even though any particular item on the list may not fit criteria for Criticism per se, a long list functions to illustrate the incompetence or personality defects of the person on the receiving end. For example, an individual might "kitchen sink" using complaints and "I" statements, such as, "I don't feel listened to by you, and you don't do your job, and I asked you to do certain chores, but you didn't, and we don't do very many fun things together lately."
4. Betrayal statements. Similar to blaming, betrayal statements specifically reference trust and commitment, implying that the person on the receiving end is either not committed, untrustworthy, or both. "How could you?" is a question frequently indicative of Criticism.
5. Negative mind reading. Generally speaking, mindreading statements express attributions about another's feelings, behaviors, or motives. They indicate Criticism when negative or accompanied by negative affect. An example of negative mind reading would be "you just don't like Tom because he smokes."

Defense {DF}

Examples of this trait include:
1. The "yes-but." SPAFF coders refer to statements that start off as momentary agreements but very quickly end in disagreements as "yes-buts." They are common indicators of defensiveness.
2. Cross-complaining. This behavior involves meeting one complaint with an immediate counter complaint. In this way, complaints are simply not responded to—cross-complaints deflect them by leading the conversation into a suddenly new direction.
3. Minimization. Defensive receivers will frequently try to minimize a complaint by asserting that the problem they are potentially responsible for was scarcely a problem in the first place. A minimizing receiver might say, for example, "You're right, I did forget to put the garbage out, but there was hardly any garbage anyway, so it really isn't a problem. It can wait until next week."
4. Excuses. Excuses are attempts to locate responsibility or blame in something other than the receiver, as in, "well, traffic was all backed up, there was nothing I could do."
5. Aggressive defenses. Oftentimes a receiver will aggressively assert things, for example, "I did not!" These are vehement denials of responsibility that come across as childish, as in "did not/did too" interactions.

Disgust {DG}

Examples of this trait include:
1. Involuntary revulsion. Here the object of disgust is some obvious image of, or reference to, an aversive, noxious stimulus, as in momentary descriptions of a gruesome physical injury.
2. Moral objection. Here the object of disgust is an action or idea that the receiver finds repulsive for moral or other symbolic reasons, as in responses to undesirable sexual practices or even political positions.

Domineer {DR}

Examples of this trait include:
1. Invalidation. Invalidation deliberately and forcefully contradicts the validity of the sender's point of view (e.g., "that's just wrong") or expressed feelings (e.g., "oh, you are not afraid, quit exaggerating").
2. Lecturing and patronizing. This indicator identifies attempts to belittle or disempower a person or a person's arguments. Many "sub indicators" suggest the presence of lecturing and patronizing, including pointing or wagging a finger while talking, citing authorities (e.g., "well, Dr. Phil says . . . "), speaking in platitudes and clichés, appealing to an ambiguous "everyone" (as in "everyone knows"), and so forth. A distinctly patronizing quality often accompanies these behaviors. Look for finger pointing used for emphasis.
3. Low balling. Low balling expresses itself in the form of questions that have predetermined answers. The questions are not merely rhetorical but also have a manipulative quality, such as, "You want me to be happy, don't you?" Low-balling behaviors are similar to sales ploys that seek to force unwary customers to answer "yes" to very simple questions (e.g., "Do you want your children to achieve their potential?") in order to manipulate them into purchasing a product.
4. Incessant speech. By using incessant speech, domineering persons can ensure that the sender is not allowed an opportunity to respond. It is a form of forcibly maintaining the floor in a conversation at all times. Incessant speech often has a repetitious, steady, almost rhythmic quality in the voice. When speaking inces-santly, domineering persons often repeat or summarize their point of view while paying very little attention to the verbal content of things said by the people with whom they are speaking. Look for finger pointing used for emphasis.
5. Glowering. Glowering is really a kind of steady gaze, often characterized by the head tilted forward with the chin down, and the outer portions of the eyebrows raised—an eyebrow configuration we refer to as "the horns" because, when configured in this way, the eyebrows do indeed resemble horns. Thus, when glowering, the "horns" are emphasized, and the person may be leaning the head, body, or both forward.

Stonewall {SW}

Examples of this trait include:
1. Active away behavior. The receiver focuses on some trivial object in order to avoid contact with the sender. Purposefully communicates an unwillingness to pay attention, especially during conversational moments characterized by high levels of negative affect. The "receiver" (i.e., the contemptuous person) is communicating the message, "I'd rather not be here right now, and I don't want to listen to you."

2. No back channels. The stonewalling person offers no vocal or nonvocal back channels such as one would find in Facilitation. There are no head nods, the neck is rigid, there are no vocal or verbal assents (as in "umm-hmmm," "yeah," "uh-huh," etc.), and no other verbal responses. There is little if any facial movement and certainly no facial mirroring or eye contact. The "no-back-channeling" behavior may occur very abruptly, as if intended to suddenly put up an obvious, though technically invisible, wall between the receiver and the sender.

3. Monitoring gaze. Within the context of "no back channels," stonewalling individuals will occasionally steal glances at, as if to remind the person to notice their lack of listening behavior.

In the following section, example labels of speech behaviors that are associated with neutral empathy are described (can lead to increased or decreased empathy depending on context). These behaviors may include behaviors that are characterized by or as FILLER {FI}, GIVING INFORMATION {GI}, STRUCTURE {ST}, and/or NO CODE {NC}.

Filler {FI}

This is a code for the few responses that are not codeable elsewhere: pleasantries or small-talk. These tend to occur at the beginning or end of the session. The Filler code should not be used often. If these exceed 5% of receiver responses, they are probably being over-coded. This code does NOT replace Affirmations like "Thanks for coming in today." In general, every other code trumps FI. This includes Giving Information and Questions. Here are examples of Filler:

"Good Morning, Yolanda."
"I assume you found a parking space OK."
"Nice weather today!"

Giving Information {GI}

The receiver gives information to the sender, explains something, educates, provides feedback, or discloses personal information. When the receiver gives an opinion but does not advise, this category would be used.

Here are some examples of providing feedback from assessment.

"You indicated during the assessment that you typically drink about 18 standard drinks per week." {GI}
"This places you in the 96th percentile for men your age." {GI}
"Your blood pressure was elevated when the nurse took it this morning." {GI}

Here are some examples of personal feedback about the sender that is not already available.

"Your doctor tells me you've been struggling with your glycemic control." {GI}
"I talked to your wife and she said she was really worried about your drinking." {GI}

Here are some examples of explaining ideas or concepts relevant to the intervention.

"This homework assignment to keep a diary of your urges to drink is important because an urge is like a warning bell, telling you to wake up and do something different." {GI}

Here are some examples of educating about a topic.

"Individuals who eat five fruits and vegetables each day to reduce their cancer risk fivefold." {GI}
"For certain kinds of cancer, like colon cancer, it's even more of a reduction." {GI}

Here are some examples of receiver self-disclosure.

"When I was in recovery this was one of the hardest things for me to address." {GI}
"I love AA." {GI}
"I always found that treatment recommendation as rather odd, but some people seem to find it helpful." {GI}

Reviewing the information contained on assessment instruments does not typically qualify as a Reflection. Informing can become a Raise Concern if there is a tone of threat or a sense of 'if . . . then' such as "If you continue to miss your methadone doses, then you'll lose your ability for take-homes." Here are examples of differential coding:

"If you do tell me that you've used drugs, I am required to disclose that to your probation officer." {GI}
"If you tell me that you've been using drugs, I'm going to tell your probation officer." {RC} (warn)

Giving Information can be combined with other responses that go beyond the simple provision of information. In these instances, any other code is going to have precedence:

You indicated during the assessment that you typically drink about 48 standard drinks per week. {GI}
That much drinking is bound to damage your health sooner or later. {RC} (warn)
Here is a diary that you can use to keep track of urges. {ST}
Keep track of your urges this week, using this diary, and bring it in next week to review with me. {DI}
Well, you are only eating two fruits per day according to this chart, even though you think you are eating five. {CO} It can be easy to deceive yourself. {CO}
AA worked for me. {GI}. It will work for you, but you need to give it a try first. {DI} We need to find the right AA meeting for you. {AD} You just didn't find a good one. {CO}"

Structure {ST}

To give information about what's going to happen directly to the sender throughout the course of treatment or within a study format, in this or subsequent sessions. To make a transition from one part of a session to another.

While Structure is commonly understood of in-session structure, e.g., "Today we are going to talk about . . . " or "Next we should discuss" . . . but there is also Structure to set up the course of treatment. For example, the center's treatment policies and guidelines (e.g., UA protocol) and the sender's treatment. Examples of Structure:

"What we normally do is start by asking you about your eating habits."
"Now I'd like to talk with you about your motivation."
"In this study I'll meet with you twice a month and the sessions will be tape recorded."
"Let's see . . . I'd like to talk about your substance use now."

Structure needs to be differentiated from Giving Information. If a receiver gives the sender information about the study or treatment in general, code as Giving Information. When there is a clear purpose of preparing the sender for what will happen, code as Structure.

"I'll ask you about your smoking every week throughout treatment." Structure (directly pertains to sender)
"We analyze all of the blood samples for nicotine levels." Giving Information
receiver: Ok, um do you realize that Wednesday is your three month mark? {QUC}
sender: Is that good?
receiver: Yeah. {GI} That's impressive. {AF}
sender: Well that's good then. {FN} receiver: So technically at three months you know we see each other weekly for the first three months and then you only have to see me twice a month. {ST} (information about sender's treatment)

sender: Ok. {FN} receiver: I am leaving in five weeks. {GI} So it's up to you if you want to see me just every other week now until things get straightened out. {EC} Then you continue to keep your carries as long as you continue to have clean ua's. {GI} (information about UA protocol)

Structure does not pertain to information from previous sessions. When a receiver discusses information from previous sessions and it does not fall under any other codes (e.g., question, confront) then code it as Complex Reflection.

receiver: Right. {FA} We've been these couple sessions, I think since like November you've been saying like your dose isn't you're not sure if the dose is holding up. {REC}

No Code {NC}

Portions of an exchange session might not be codeable, due to factors like poor audio quality, incomplete utterances, intrusions by third parties, interruptions, or in-session exercises. In these cases, coders will assign "No Code" to sender or receiver utterances. Although this code is rare, to ensure good inter-rater reliability it is important to use NC when warranted.

The described empathy behaviors or characteristics, which may be used to label statements in both training data and in communication platforms upon which correctors and predictions may be based, are only given by way of example. It should be appreciated that other behaviors or characteristics may be used, and/or defined in different ways, to a similar effect.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGP") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. An empathy correction system, comprising:
one or more processors; and
memory that stores a plurality of empathy correction models and computer-executable instructions that, if executed, cause the one or more processors to:
train the plurality of empathy correction models using training data obtained from outputs of one or more empathy games that elicit as inputs from one or more third parties labels indicating an empathy score for individual statements of a plurality of statements presented in the one or more empathy games, the empathy score indicating at least one empathy characteristic upon which the empathy score is based, the training data comprising the plurality of statements each associated with a corresponding empathy score and an empathy characteristic output from the one or more empathy games, wherein the empathy characteristic comprises at least two of empathy, openness, collaboration, and synchrony;
detect at least one statement entered into communication platform in a communication session;
responsive to the detecting, obtain the at least one statement from the communication platform;
determine an empathy assessment for the at least one statement using the plurality of empathy corrections models, the empathy assessment comprising:
a qualitative identification of whether the at least one statement comprises a low empathy statement, a neutral empathy statement, or a high empathy statement; and
identification of at least one empathy characteristic of a plurality of empathy characteristics that forms the basis for the qualitative identification;
upon determining that the empathy assessment comprises the low empathy qualitative identification, generate at least one correction to the at least one statement to improve empathy of the at least one empathy characteristic using the plurality of empathy correction models, the at least one correction comprising replacing at least a first word in the at least one statement with a different second word in the communication session; and
provide the at least one correction through a graphical user interface that interfaces with the communication platform.

2. The empathy correction system of claim 1, wherein the memory stores a plurality of empathy prediction modes, wherein the memory stores additional computer executable instructions that, if executed, further cause the one or more processors to:
train the plurality of prediction models based on the training data; and
generate a prediction of a response to the at least one statement using the plurality of empathy prediction models.

3. The empathy correction system of claim 1, wherein the at least one empathy characteristic comprises a first empathy characteristic and a second empathy characteristic, and wherein the memory stores additional computer executable instructions that, if executed, further cause the one or more processors to:
select a first model from the plurality of empathy correction models to correspond to the first empathy characteristic and a second model from the plurality of empathy correction models to correspond to the second empathy characteristic.

4. The empathy correction system of claim 1, wherein the memory stores additional computer executable instructions that, if executed, further cause the one or more processors to:
obtain additional training data to be input into the empathy games from at least one of business to business user data, webscraping, psychotherapy transcripts, academic data use agreements, or therapist training data.

5. The empathy correction system of claim 1, wherein the memory stores additional computer executable instructions that, if executed, further cause the one or more processors to:
provide a selection to replace the statement with the correction through the graphical user interface.

6. The empathy correction system of claim 1, wherein the memory stores additional computer executable instructions that, if executed, further cause the one or more processors to:
use at least one of the empathy assessment or the at least one correction as training data for the plurality of empathy correction models.

7. The empathy correction system of claim 1, wherein the memory stores additional computer executable instructions that, if executed, further cause the one or more processors to:
provide the empathy assessment, regardless of whether the empathy assessment comprises the low empathy qualitative identification through the graphical user interface that interfaces with the communication platform.

8. The empathy correction system of claim 1, wherein the at least one correction is provided through the graphical user interface that interfaces with the communication platform prior to the at least one statement being transmitted to a recipient in the communication session.

9. A computer-implemented method, comprising:
obtaining training data to train a plurality of empathy correction models, the training data obtained through one or more training modules that elicit labels indicating an empathy score for individual statements of a plurality of statements, the empathy score indicating at least one empathy characteristic upon which the empathy score is based, wherein the empathy characteristic comprises at least two of empathy, openness, collaboration, and synchrony;
receiving at least one statement from a communication platform in a communication session;
determining an empathy score for the at least one statement using the plurality of empathy corrections models, the empathy score comprising an indication of a first empathy characteristic of the at least one statement upon which the empathy score is based;
comparing the empathy score to an empathy threshold to produce an empathy comparison;
upon determining that the empathy score is below the empathy threshold based on the empathy comparison, generating at least one correction to the at least one statement to improve empathy of the first empathy characteristic using the plurality of empathy correction models, the at least one correction comprising replacing at least a first word in the at least one statement with at least one second word in the communication session; and
providing the at least one correction to the communication platform in the communication session.

10. The computer-implemented method of claim 9, wherein providing the at least one correction to the communication platform comprises providing a selection to replace the statement with the correction.

11. The computer-implemented method of claim 9, wherein the at least one empathy characteristic comprises at least one of a low empathy characteristic, a neutral empathy characteristic, or a high empathy characteristic.

12. The computer-implemented method of claim 9, further comprising obtaining additional training data to be input into the training modules from at least one of webscraping, psychotherapy transcripts, academic data use agreements, or therapist training data.

13. The computer-implemented method of claim 12, wherein at least one of the webscraping, psychotherapy transcripts, academic data use agreements, or therapist training data comprises labeled data.

14. The computer-implemented method of claim 9, wherein the training data is also used to train one or more empathy prediction models, the method further comprising:
determining a prediction of a response to the at least one statement using the one or more empathy prediction models.

15. The computer-implemented method of claim 9, wherein the communication platform comprises one of an email platform, a messaging platform, a text message application, or a video communication platform.

16. The computer-implemented method of claim 9, wherein the plurality of empathy correction models comprise individual empathy correction models corresponding to individual empathy characteristics.

* * * * *